(12) United States Patent
Van Amstel et al.

(10) Patent No.: US 8,928,891 B2
(45) Date of Patent: Jan. 6, 2015

(54) OPTICAL DISTANCE SENSOR WITH TILT ERROR CORRECTION

(75) Inventors: Willem Dirk Van Amstel, Geldrop (NL); Leonard Antonino Cacace, Eindhoven (NL); Rens Henselmans, Eindhoven (NL)

(73) Assignees: Nederlandse Organisatie voor toegepast-natuurwetenschappelijk Onderzoek TNO, Delft (NL); Wimoptik B.V., Geldrop (NL); AC Optomechanix, Eindhoven (NL)

( * ) Notice: Subject to any disclaimer, the term of this patent is extended or adjusted under 35 U.S.C. 154(b) by 879 days.

(21) Appl. No.: 12/600,434

(22) PCT Filed: May 16, 2008

(86) PCT No.: PCT/NL2008/050294

§ 371 (c)(1),
(2), (4) Date: Mar. 17, 2010

(87) PCT Pub. No.: WO2008/143502

PCT Pub. Date: Nov. 27, 2008

(65) Prior Publication Data

US 2010/0225926 A1 Sep. 9, 2010

(30) Foreign Application Priority Data

May 16, 2007 (EP) .................................... 07108395

(51) Int. Cl.
*G01B 11/02* (2006.01)
*G01B 11/24* (2006.01)

(52) U.S. Cl.
CPC .......... *G01B 11/2441* (2013.01); *G01B 11/026* (2013.01)
USPC ....................................................... 356/510

(58) Field of Classification Search
CPC .. G01B 11/026; G01B 11/2441; G03B 27/42; G03F 7/70341

USPC .......... 356/450–521, 73, 73.1, 601–613, 624, 356/364–370
See application file for complete search history.

(56) References Cited

U.S. PATENT DOCUMENTS 3,847,485 A * 11/1974 Zanoni ......................... 356/624
4,660,970 A    4/1987 Ferrano
(Continued)

FOREIGN PATENT DOCUMENTS

DE          4211875    *  4/1992  ............. G01B 11/02
DE          42 11 875 A1   10/1993
(Continued)

OTHER PUBLICATIONS

International Search Report dated Feb. 13, 2009, for PCT/NL2008/050294.

*Primary Examiner* — Tarifur Chowdhury
*Assistant Examiner* — Michael P Lapage
(74) *Attorney, Agent, or Firm* — Leydig, Voit & Mayer, Ltd.

(57) ABSTRACT

In an optical distance sensor for measuring object surfaces with high precision and comprising an objective lens for focusing a measuring beam to a measuring spot on the surfaces, measuring errors due to tilt of an object surface can be detected by using a pupil monitor, which senses the radiation intensity distribution of the reflected measuring beam effectively in the pupil of the objective lens to generate a tilt signal, which can be supplied to a correction/calibration table to obtain a correction signal, which is suitable for correcting the primary distance measuring signal of the sensor. Especially for a differential confocal distance sensor having pinholes arranged in front of radiation-sensitive detectors, a further order of correction can be obtained by determining optimum position and diameter of these pinholes.

21 Claims, 15 Drawing Sheets

(56) References Cited

U.S. PATENT DOCUMENTS

| | | | |
|---|---|---|---|
| 5,033,856 A * | 7/1991 | Nose et al. | 356/609 |
| 5,424,834 A | 6/1995 | Akedo et al. | |
| 5,568,256 A * | 10/1996 | Korner et al. | 356/512 |
| 6,504,608 B2 * | 1/2003 | Hallmeyer et al. | 356/369 |
| 2003/0095265 A1 * | 5/2003 | Hill | 356/493 |
| 2004/0189983 A1 * | 9/2004 | Takahashi et al. | 356/139.1 |
| 2006/0066855 A1 * | 3/2006 | Boef et al. | 356/401 |
| 2008/0180685 A1 * | 7/2008 | De Lega et al. | 356/511 |
| 2010/0012818 A1 * | 1/2010 | Baker et al. | 250/201.9 |

FOREIGN PATENT DOCUMENTS

| | | |
|---|---|---|
| EP | 0 620 458 A | 10/1994 |
| EP | 1 610 088 A | 12/2005 |
| JP | 61 140809 A | 6/1986 |

* cited by examiner

OPTICAL DISTANCE SENSOR WITH TILT ERROR CORRECTION

FIELD OF THE INVENTION

The invention relates to an optical sensor for measuring the distance to an object surface, which sensor comprises an illumination system that is provided with a radiation source for supplying a measuring beam and focusing unit for focusing the measuring beam to a spot on the object surface and a detection system comprising radiation-sensitive detection means for converting measuring beam radiation reflected from the object surface into an electrical signal that represents the actually measured distance and a signal processing circuit for processing this signal.

BACKGROUND

An example of such a sensor is a differential confocal sensor, a sensor based on the astigmatic focus detection method, a sensor based on the critical angle detecting method and other sensors of different types.

Such a sensor may be included in a measuring apparatus for measuring for example large rotationally non-symmetrical free form and aspherical optical elements with increasingly tight specifications regarding the shape. From the scientific world and the industry there is an increasing demand for such optical elements and new technologies allow the manufacture of these elements. In the manufacturing process of optical elements, measurement of these elements plays an essential role as a major source of feedback in and between process steps as well as for evaluation of the finished optical element. Thus there is an ever-increasing demand for a high precision contact less, i.e. optical, measuring apparatuses, which shows substantially better resolution and accuracy than conventional apparatuses. An essential part of such an apparatus is the non-contact probe, or optical sensor, which measures the distance to the surface of an object, for example a free form surface. A free-form surface is understood to mean a non-rotationally smooth surface showing an inclination angle with respect to the optical axis of the sensor that varies unidirectionally from 0 degrees to 5 degrees.

In a measuring apparatus under development the optical element to be measured will be arranged on an air-bearing spindle, which rotates, for example at about 1 revolution per second. The optical sensor will be positioned perpendicularly to the rotationally symmetric best-fit contour of the surface under test (hereinafter SUT) by means of an air-bearing sensor-driving R, Z, PSI-mechanism. This mechanism allows movement of the sensor in the vertical (Z) direction, in a horizontal radial (R) direction and rotation of the sensor axis about an angle PSI in a vertical plane such that this axis is at any time substantially perpendicular to the momentarily measured area of the SUT. The measuring apparatus may measure the SUT for example track-wise. When the sensor is measuring a track of the SUT, the R-, Z-, and PSI positions will be stationary. After a first track has been measured, the sensor is positioned on a second track, which is spaced from the first track for example at about 0.5 to 2.2 mm. This is repeated until the complete surface is measured. The apparatus is, for example intended for measuring smoothly curved surfaces for which a track spacing of the order of 2 mm gives sufficient good results.

The envisaged measuring apparatus should satisfy the following requirements:
 it should allow universal measurement of free-form surface shapes;
 it should use non-contact type measurement;
 it should allow measurement of large optical elements (with a diameter of up to 500 mm);
 the measurement uncertainty (2 sigma), which will be explained later, should be smaller than 30 nm, and
 the apparatus should be fast so that measurement of a surface can be performed within a short time interval.

An optical sensor for a measuring apparatus that satisfies these requirements should have the following qualities:
 contact less measurement;
 measurement uncertainty (2 sigma) of at most 10 nm for surfaces perpendicular to the sensor axis, i.e. at 0 degrees inclination, and at most 35 nm for surfaces having inclinations up to 5 degrees;
 measurement range up to 5 mm;
 resolution down to 1 nm, and
 absolute measurement.

It has appeared that conventional optical measuring methods and apparatuses do not allow measurement of free-form smooth surfaces with the required accuracy, defined herein above.

U.S. Pat. No. 5,424,834 discloses an optical displacement sensor for measurement of shape and coarseness of an object surface, which sensor comprises, in addition to conventional means for measuring the distance to the object surface, a transverse position detection system for measuring transverse displacement of the reflected beam spot. The distance measuring means may be a differential confocal sensor or a so-called astigmatic sensor and the means for measuring transverse displacement may be a position-sensitive detector (PSD).

The PSD in the sensor of U.S. Pat. No. 5,424,834 measures only the transverse displacement of the beam spot relative to the optical axis of the distance measuring system and the measured values are used to control the direction of the reflected measuring beam such that it is always coaxial with the said optical axis. This active control is performed by an actuated mirror, which is called a beam polariscope. This puts a limitation to the measuring rate. Even with the fastest actuator for such a correction mirror a minimum setting time will be needed for correction of the local inclination of the measured surface, so that the correction is delayed. For an optically perfect correction the mirror should be shifted or translated, because it is arranged in a collimated beam, which means that correction is possible only in one direction, or degree of freedom. To correct for inclination, two actuated mirrors would be needed, which would render the system even more complex and slower. A more attractive system, because it is simpler and faster, seems to be a system that uses two tilting mirrors or one mirror than can be tilted in two mutual perpendicular directions. However such a system will show more aberrations and will cause a less accurate performance of the distance measuring part of the sensor. It is also suggested in U.S. Pat. No. 5,424,834 to use, instead of mechanically movable mirrors, a much faster Electro-optical element, but this is a very expensive and complicated solution. An Electro-optical element requires a high voltage and its effect is small so that it would be difficult, if not impossible, to realize the required shift. Moreover, two Electro-optical elements would be needed and the optical path length of the sensor system would increase substantially.

DE 4211875 describes a distance measuring system wherein tilt of the object surface is detected. The measurement beam is split. The split off beam is directed to an additional detector in a way, so that a different dependence on tilt angle occurs in the signal from the additional detector. This document mentions the possibility of on-line tilt correction, using calibration data. This document does not take optical system deficiencies of the sensor into account.

U.S. Pat. No. 4,660,970 and JP 61-140809 likewise disclose object distance sensors. JP 61-140809 provides for a tilt angel measurement.

In view of the requirement that for a non tilted surface area the 2 sigma measurement uncertainty of the distance sensor should be 10 nm or less for a non-tilted surface and 35 nm or less for a surface tilt of 5 degrees, the measurement range for distance measurement is limited to some microns. The 2 sigma measurement uncertainty is understood to mean that there is a chance of 95% that the actual distance is within 35 nm (2 sigma for a surface tilt of 5 degrees) of the measured value. For example an increase to 5 mm is desirable.

SUMMARY

It is an object to provide an optical sensor as defined in the opening paragraph, which sensor shows a substantially improved accuracy and thus allows measurement of, for example free-form surfaces and rough surfaces.

According to another aspect, it is an object to increase the measurement range, so that a compact and cheaper, but also more stable optical sensor can be used.

An optical sensor as claimed in claim 1 is provided that includes a pupil-sensing system, which system comprises a beam splitter, arranged between the focussing unit and the detector, for splitting a reflected measuring beam into a pupil-sensor beam and a distance measuring beam, a position-sensitive detector, arranged in the path of the pupil-sensor beam, to determine shift of the pupil-sensor beam radiation distribution and a tilt-error determining circuit, which circuit comprises a look-up table obtained from calibration and is coupled to the signal processing circuit to correct the actually measured distance for tilt of the object surface area being measured.

A pupil-sensing system is understood to mean a sub-system of the sensor by means of which a tilt dependent shift of the reflected measuring beam radiation distribution can be determined, whereby this shift is to a high degree independent of small displacements of the measured surface along the sensor axis from the null-position.

This is based on the insight that for measuring surface profiles with the required unconventional precision and reliability, optical system deficiencies of the sensor, which up to now could be neglected, should be taken into account. Examples of such deficiencies are optical aberrations, manufacturing errors of the optical components of the system and alignment errors. The deficiencies become manifest if the measured area of the object surface is tilted or inclined with respect to the axis of the optical sensor. Depending on the tilt- or inclination angle the reflected measuring beam will propagate through different cross-section areas of the optical elements of the sensor. The reflected measuring beam will experience different aberrations for different tilt angles, which results in a tilt, or inclination, dependent measurement error. It should be noted that not only slope variations due to shape of the measured surface, but also local slope variations due to surface roughness may cause inclination dependent errors (hereinafter IDE).

This solves the problem of IDE and allows compensation for these errors. Accordingly the radiation distribution of the reflected measuring beam in or near the pupil of the focussing unit, such as an objective lens, or other focusing means is measured and the measured values are used to correct the measured distance signal, i.e. the output signal of the radiation-sensitive means. The measured radiation distribution varies with the local tilt angle of the object surface, i.e. the tilt angle of the surface area being measured. This radiation distribution represents all system deficiencies, for example the tilt-dependent aberrations the measuring beam has met. A position-sensitive detector, also known as PSD, which is arranged in the path of the pupil-sensor beam, i.e. a radiation beam that is split off from the measuring beam that is reflected by the object surface and passes the focussing means for a second time, can measure in first instance the center of the intensity distribution, which may also be called the position of the beam center, in the pupil. Determining the position of the beam center for each measurement at the object surface allows calibration of the sensor in order to compensate for tilt-, or inclination dependent errors (hereinafter IDE). This becomes possible by using a look-up table obtained by means of a calibration procedure. For each position of the beam center a value can be interpolated from the lookup table and with this value the IDE can be compensated to a high degree.

It is remarked that U.S. Pat. No. 5,424,834 discloses an optical displacement sensor for measurement of shape and coarseness of an object surface, which sensor comprises, in addition to conventional means for measuring the distance to the object surface, a transverse position detection system for measuring transverse displacement of the reflected beam spot. The distance measuring means may be a differential confocal sensor or a so-called astigmatic sensor and the means for measuring transverse displacement may be a position-sensitive detector (PSD). Only at a first glance the sensor of U.S. Pat. No. 5,424,834 seems similar to this sensor. However the PSD in the sensor of U.S. Pat. No. 5,424,834 measures only the transverse displacement of the beam spot relative to the optical axis of the distance measuring system and the measured values are used to control the direction of the reflected measuring beam such that it is always coaxial with the said optical axis. This active control is performed by an actuated mirror, which is called a beam polariscope. This puts a limitation to the measuring rate. Even with the fastest actuator for such a correction mirror a minimum setting time will be needed for correction of the local inclination of the measured surface, so that the correction is delayed. For an optically perfect correction the mirror should be shifted or translated, because it is arranged in a collimated beam, which means that correction is possible only in one direction, or degree of freedom. To correct for inclination, two actuated mirrors would be needed, which would render the system even more complex and slower. A more attractive system, because it is simpler and faster, seems to be a system that uses two tilting mirrors or one mirror than can be tilted in two mutual perpendicular directions. However such a system will show more aberrations and will cause a less accurate performance of the distance measuring part of the sensor. It is also suggested in U.S. Pat. No. 5,424,834 to use, instead of mechanically movable mirrors, a much faster Electro-optical element, but this is a very expensive and complicated solution. An Electro-optical element requires a high voltage and its effect is small so that it would be difficult, if not impossible, to realize the required shift. Moreover, two Electro-optical elements would be needed and the optical path length of the sensor system would increase substantially.

A difference between the active beam direction control system of U.S. Pat. No. 5,424,834 and the inclination compensating system that is described here is that in the latter system the measuring results obtained from determining the intensity distribution of the measuring beam are related to a lookup table and finally used to correct the measuring results of the distance measuring part of the sensor. In this way, in this sensor all types of aberrations, alignment errors and manufacturing errors can be compensated for. This is not possible in the sensor of U.S. Pat. No. 5,424,834; this document even does not mention these errors, which would affect both the distance sensing portion and the transverse displacement-sensing portion of the sensor.

A preferred embodiment of the optical sensor is characterized in that the position-sensitive detector is effectively arranged in the neighborhood of the pupil of the focussing means.

In this way the optical path of the reflected measuring beam is limited. Moreover the largest aberration are usually caused by the objective system.

Effectively arranged in the pupil is understood to mean that the detector, although it is arranged in an optical path behind the beam splitting means, the optical distance between the radiation-sensitive surface of the detector and the focussing means corresponds to the exit pupil distance of the focussing means. Arranged in the neighborhood of pupil is understood to mean that the detector is in principle arranged in the pupil plane, but small deviations from this position are allowed.

The position-sensitive detector is preferably a two-dimensional lateral effect photo diode with an active area of, for example 10×10 mm$^2$. It shows a high dynamic range, good linearity and ample response speed. However this detector may also be another type of two-dimensional detector, like a CCD sensor or a CMOS sensor.

A further preferred embodiment is characterized in that beam splitting means is arranged at a position where the reflected measuring beam is collimated beam.

If arranged in this position, the beam splitting means introduce minimum and negligible aberrations in the measuring beam. This position requirement should be met at least for the null position of the object surface; i.e. the measured area of this surface is in the focus plane of the focussing means. Different types of beam splitter may be used, for example a semi-reflecting plane-parallel or wedge plate, a polarizing or non-polarizing beam-splitting cube, or a diffracting element such as a diffraction grating.

It is also possible to adapt the anti-reflection coating on the pupil monitor, for example in the form of a PSD, so that it reflects, example 50% of the incident radiation. The reflected radiation can be sent to the detector branch of the optical sensor.

A preferred embodiment of the sensor having an enlarged measurement range is characterized in that it comprises an actuator for moving the focussing means along its axis and a measuring system for measuring the axial position of the focussing means.

According to another aspect it is an object to increase the measurement range, so that a compact and cheaper, but also more stable optical sensor can be used.

A preferred embodiment of the sensor having an enlarged measurement range is characterized in that it comprises an actuator for moving the focusing unit along its axis and a measuring system for measuring the axial position of the focusing unit. To increase the measurement range to, for example 5 mm, the focusing unit can be made movable in the axial direction, whereby it is guided by for example elastic flexures and driven by, for example a voice coil. The voice coil is controlled by an output signal of the distance measuring part of the sensor. The measuring system is constituted by an interferometer system and the focusing unit is provided with a mirror for reflecting the interferometer beam.

As is known an interferometer is a precise displacement-measuring instrument. It is very suitable to measure the axial displacement of the focusing unit, or objective, which is provided with a reflector for reflecting the interferometer beam.

More preferably this embodiment is characterized in that the interferometer system is a double-pass interferometer system.

A double-pass interferometer system is understood to mean an interferometer system wherein the interferometer beam after having travelled to and from the objective mirror it is reflected again to this mirror to travel for a second time to and from this mirror before it reaches the detector of the interferometer. Since the interferometer beam is reflected twice at the objective mirror, tilt of this mirror does not affect the interferometer system output. An aspect of the optical sensor provided with an interferometer system, such as the sensor described herein before, relates to an optimum use of the optical elements, which are needed for the required beam handling, i.e. change of the direction of the beams.

An optical sensor such as described herein before and having a beam splitting element for directing the distance measuring beam towards the object surface and for directing the reflected measuring beam towards the radiation-sensitive detection means, wherein this aspect is realized is characterized in that said beam splitting element is arranged in the path of the interferometer beam and constitutes the central beam splitter cube of the interferometer system, which cube in combination with at least two additional reflecting elements at different sides of the cube, guides the interferometer beam to and from the mirror on the focusing unit.

In this way a beam splitter can be saved so that the optical sensor is not only more compact and cheaper, but also more stable The intention of the terms: the sensor as described herein before, is to state that the double use of the same beam splitting cube can be applied not only in a distance sensor with a position-sensitive detector but also with any distance sensor wherein the objective is movable and which is provided with an interferometers system for measuring displacement of the objective.

The optical sensor with a common beam divider for the distance measuring beam and the interferometer beam may be further characterized in that a first one of the additional reflecting elements is a truncated retro reflector prism having two opposite flat areas for passing the distance measuring beam and a second one of the additional reflecting elements is one of a plane mirror and a retro reflector prism.

With respect to the distance measuring system, the optical sensor is preferably characterized in that, the detection system comprises a further beam splitter for splitting the distance measuring beam into a first sub-beam and a second sub-beam, a first pinhole diaphragm and a first radiation-sensitive detector successively arranged in the first sub-beam and a second pinhole diaphragm and a second radiation-sensitive detector successively arranged in the second sub-beam, whereby the optical distances between the further beam splitter and the first pinhole and the second pinhole, respectively are different.

This distance detection system itself is known as differential confocal sensor. In this sensor the radiation beam which has been reflected by the object surface and passed by the focusing means is divided in two sub-beams each of which is incident on a separate pinhole diaphragm. By subtracting the output signals of the photodiodes arranged behind the pinholes, a focus-error-signal (FES) is obtained that has a substantially linear range about the best-focus point. The FES can be normalized to suppress sensitivity to variations in reflectivity of the measured surface and to various other error sources. The differential confocal sensor has proven to be an accurate and reliable distance sensor for measuring down to a minimum distance of, for example the order of 100 nm. By implementing FES in the confocal sensor, i.e. correct for inclination dependent errors, its accuracy increases with at least a factor 10 and the resolution can be improved up to the order of 1 nm According to another aspect, inclination dependent errors which arise in differential confocal sensor at the envisaged measurement range and which are inherent to the measurement principle can be reduced to an acceptable minimum. This measurement inherent IDE is caused by shifting of the reflected measuring beam radiation away from the optical axis at the locations of the pinhole diaphragms. A differential confocal sensor wherein this type of IDE is reduced to an acceptable level is characterized in that the positions and the opening diameters of the pinholes satisfies the following condition:

$$u_{ph\_dl} = 1.0196 + 0.0336 D_{ph\_dl} + 0.2832 D_{ph\_dl}^2 + 0.5876 D_{ph\_dl}^3 - 0.4033 D_{ph\_dl}^4 + 0.0763 D_{ph\_dl}^5$$

within the range: $D_{ph\_dl} = 0\text{-}2$ and $u_{ph\_dl} = 0\text{-}3$
wherein:

$$D_{ph\_dl} = D_{ph}/D_0$$

$$U_{ph\_dl} = u_{ph}/zr$$

and $D_{ph}$ is the pinhole diameter, $D_0$ is the beam waist diameter of the measuring beam is the distance between the pupil and best focus and $z_r$ is the radial offset, due to tilt of object surface, of the measuring beam at the location of the pupil.

By means of this measure, the accuracy may also be improved by a factor 10.

It is remarked that U.S. Pat. No. 5,991,040 describes an optical distance sensor that uses the confocal principle and states that tilt and object curvatures do not affect the distance measurement result if both the pinholes and the illuminated object areas are minimized. This document does not disclose that pinhole diameters and the pinhole positions should satisfy the above equation. Moreover, U.S. Pat. No. 5,991,040 is concerned with another problem, namely obtaining a high measurement data rate. To that end the sensor is equipped with a number of measuring channels each comprising a radiation source and a corresponding confocal receiver, which channels are distinguished from each other by means of time-multiplexing or by different wavelength. A peak detector is included to determine which channel is best in focus. Thus the distance sensor of U.S. Pat. No. 5,991,040 is of quite another nature than the differential confocal sensor described here.

It should be noted that the measure to reduce the measurement-principle inherent IDE and the measure to correct IDE caused by optical aberrations in the sensor and manufacturing tolerances can be used in combination so that an improvement of the said two factors is obtained. However, under circumstances it may be sufficient to use only one of the measures.

BRIEF DESCRIPTION OF THE DRAWING

These and other aspects will be apparent from and elucidated by way of non-limitative example with reference to the embodiments described hereinafter. In the drawings.

DETAILED DESCRIPTION OF PREFERRED EMBODIMENTS

Figure 1:
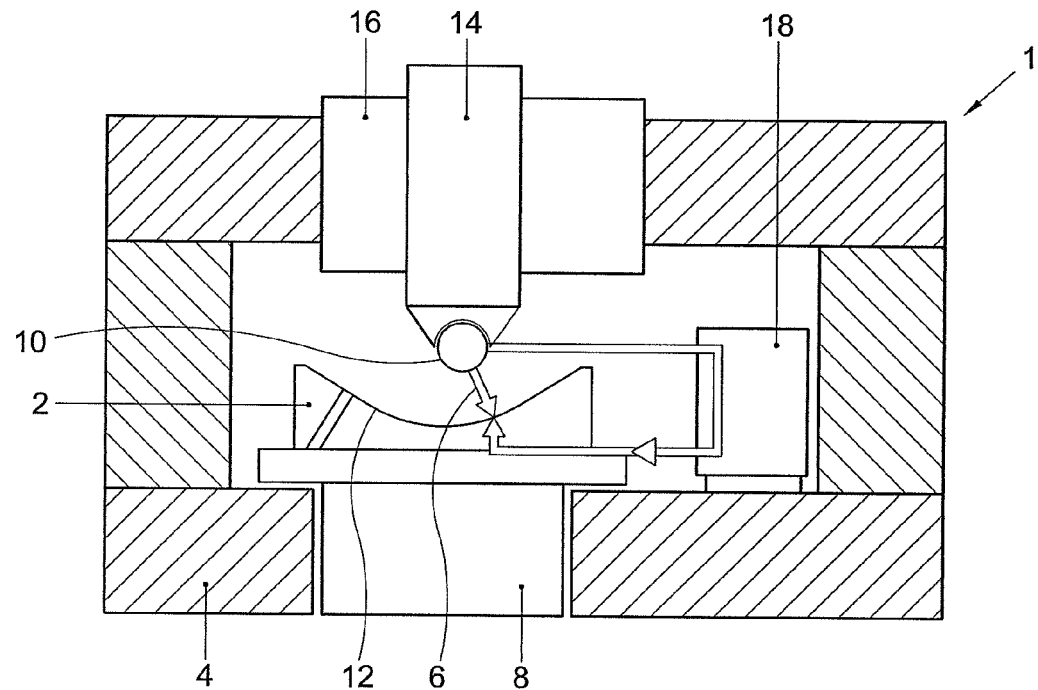
FIG. 1 shows a principle diagram of a measuring apparatus.

To illustrate the environment in which the distance sensor is intended to be used FIG. 1 shows very schematically a measuring machine 1 for measuring an object 2, such as an optical component. The machine may comprise three main modules: a motion system, a metrology system and the non-contact probe, or optical sensor.

The motion system includes a base 4, for example made of granite, which may be suspended on vibration isolators, not shown. The motion system positions the optical sensor 6 in radial-, vertical- and a slope direction relative to the object 2. During measurement the object is rotated continuously, for example at one revolution per second, by means of an air-bearing spindle 8. The optical sensor 6 is mounted on a pivoting psi axis 10 to position it perpendicularly to rotationally best fit of the object surface 12 to be measured. The pivoting axis 10 is mounted on a vertical Z-stage 14, which is aligned directly to a vertical plane of the granite base 4, for example by three air bearings, not shown, to provide an accurate plane of motion. The motion system comprises also an R-stage 16. The R-, Z-, psi-motion system will be stationary when the optical sensor is measuring a track of the object surface 12. After a first track has been measured the probe is positioned on a second track, which is spaced at, for example 0.5 to 2 mm from the first track, and the second track will be measured. This procedure will be continued until the entire surface is measured.

The metrology system of the measuring machine in indicated by reference numeral 18 in FIG. 1. This system measures the position of the sensor 6 and of the object relative to a metrology frame. The axial, radial and tilt error motion of the object spindle may be measured by a number of capacitors. As will be explained further on, the vertical position of the optical sensor 6 is measured by an interferometer. Since the improvements relate to the optical sensor, i.e. the third module of the measuring machine, this machine will not be described in detail. This type of measuring machine is described in European Patent 1668318.

Figure 2:
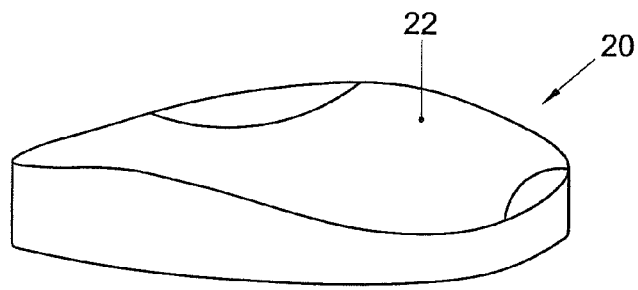
FIG. 2 shows an example of a free-form surface that can be measured by means of an optical sensor.

The machine is intended for measuring the shape of a/o. smoothly curved surfaces, for which measuring-track spacing of 0.5 to 2 mm is sufficient. FIG. 2 shows an example of such a surface 22 of a free-form optical element 20, which is an aspherical, non rotationally symmetric, element. The machine can also be used for measuring other types of surface shapes, such as rotationally symmetric shapes.

The measuring machine may be designed such that an overall measuring uncertainty (2 sigma) of 30 nm can be obtained for rotationally symmetric or slight free-form optical elements or other objects. For radical free-form surfaces the measurement uncertainty is about 100 nm. To fully utilize the capabilities of such a machine an optical probe, or -sensor, should be used, which satisfies the requirement that an expanded measurement uncertainty of 10 nm for rotationally symmetric surfaces, i.e. having 0 degrees surface inclination relative to the sensor axis, and 35 mm for free-form surfaces with a local surface inclination of 5 degrees can be obtained. Such an optical sensor preferably shows a resolution that is at least on order of magnitude smaller that the measurement uncertainty, which means that the resolution is preferably of the order of 1 nm.

It has been established that a differential confocal sensor is most suitable to start with in order to realize the above mentioned requirements. This type of optical sensor shows a high sensitivity over a relative large linear range and allows obtaining a large dynamic measuring range. Range and resolution this sensor type can be varied by varying system parameters; for a resolution of 1 nm the measuring range is typically of the order of microns. A differential confocal sensor uses two radiation-sensitive detectors arranged behind corresponding pinholes. By subtracting one detector signal from the other the measurement signal is obtained. Normalizing this signal, by dividing it by the sum of the detector signals renders the measurement result independent of variations in reflectivity of the surface being measured, or the surface under test (SUT). Normalization of the measuring signal also eliminates the influence of a number of other sources of noise and uncertainty on the measuring signal.

In a first order, the measuring signal of a differential confocal sensor is insensitive to tilt of the SUT if the measured SUT area is in the focus of the measuring beam. If the measured area is out of focus, the measuring signal will show similar errors for equal inclinations with different orientations, because the optical system of the sensor is rotationally symmetric around the optical axis.

Figure 3:
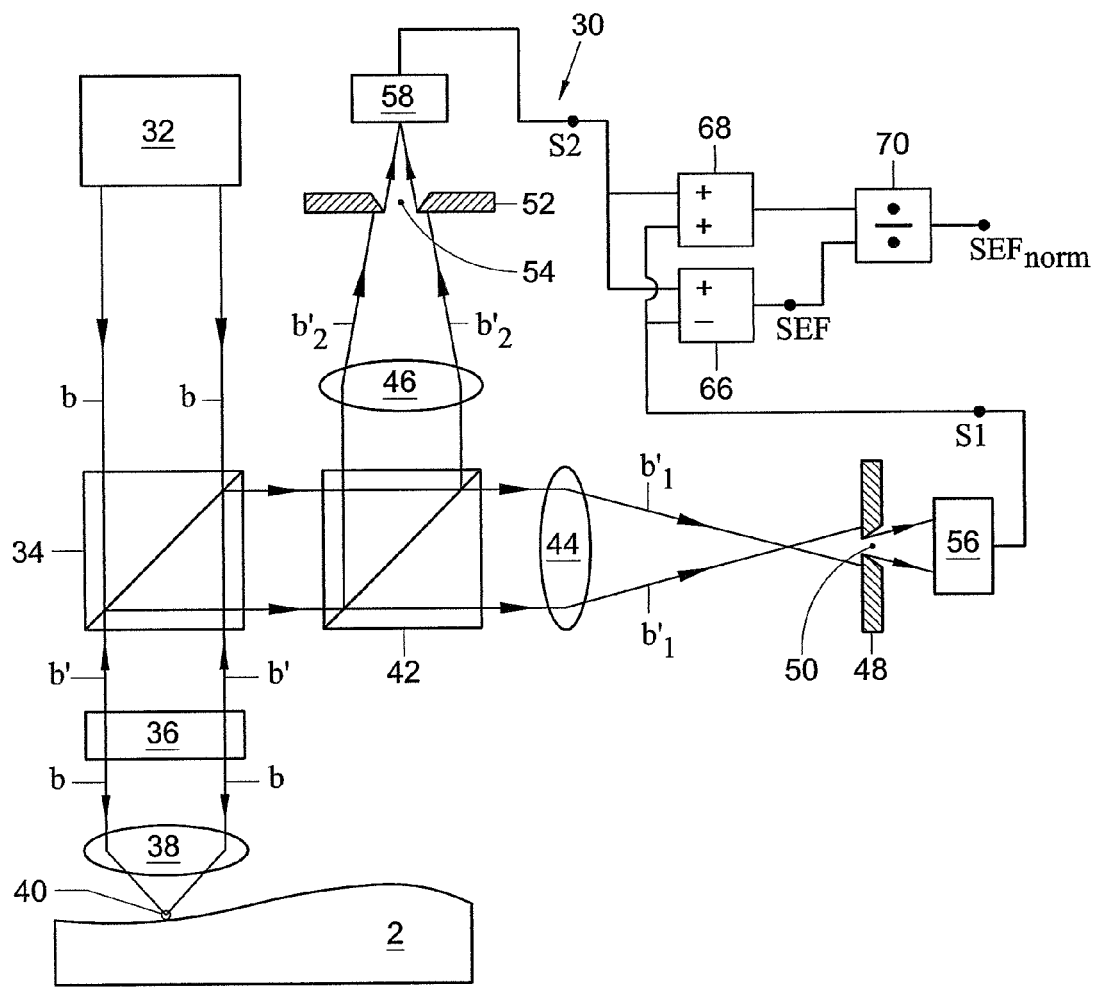
FIG. 3 shows a diagram of a conventional differential confocal distance sensor.

FIG. 3 shows a diagram of a differential confocal sensor. This sensor comprises a radiation source 32, preferably a diode laser source, which supplies a collimated and linearly polarized radiation beam b. This beam, i.e. the measuring, beam has a Gaussian intensity distribution and is incident on a beam splitter 34, preferably a polarizing beam splitter (PBS), which is adapted to the polarization direction of the beam b so that substantially all radiation of the beam is transmitted towards a focussing means in the form of an objective lens system 38 comprising one or more lenses. The objective system focuses the measuring beam b to a radiation spot 40 on or near to an object surface, or surface under test (SUT) 2. The objective lens system has a short focal length relative to the beam diameter so that the beam leaving has a high numerical aperture (NA). At least a part of the spot radiation is reflected by the SUT and passes the objective system 38 for a second time. Between the beam splitter 34 and the objective system 38 a quarter wave (lamda/4−) plate 36 is arranged, which fast axis is rotated over 45 degrees with respect to the polarization direction of the beam b so that the beam leaving this plate is circularly polarized. Upon reflection at the SUT 2 the circular polarization of the measuring beam is inverted from left-hand circularly to right-hand circularly so that the reflected beam b' after passing the lamda/4 plate 36 is linearly polarized whereby its polarization direction is perpendicular to the polarization direction of the beam b. The polarizing beam splitter 34 reflects the reflected measuring beam b' towards the detection system, at the right side of FIG. 3. If the SUT area being measured is located at best focus of the incident beam b, the reflected beam b' leaves the objective system 38 as a collimated beam.

The detection system comprises a neutral (non-polarizing) beam splitter 42 which splits the reflected beam b' into two equal sub-beams b'$_1$ and b'$_2$. In the path of each of these sub-beams an imaging lens systems 44 and 46, respectively is arranged for focussing the respective sub-beam. The lens systems 44 and 46, which may comprise one or more lens elements and have a focal length which is large relative to the diameter of the lens systems so that the sub-beams leaving the lens systems 44 and 46 have a low numerical aperture. In each of the sub-beams a pinhole diaphragm 48 and 52 respectively is arranged having a pinhole 50 and 54, respectively that is undersized relative to the sub-beam diameter. Diaphragm 48 is arranged just behind focus of sub-beam b'$_1$ and diaphragm 52 is arranged just in front of focus of sub-beam b'$_2$. Behind the diaphragms radiation-sensitive detectors, preferably photo diodes, 56 and 58 are arranged for measuring the amount of radiation passing through the pinhole 50 and 52 respectively. A measuring unit for this amount is the fractional transferred power (FTP), i.e. the amount of radiation passing through the pinhole divided by the amount of light incident on the diaphragm.

If, as in shown in FIG. 3, the SUT 2 is in best focus of the incident measuring beam b, the reflected beam b' leaving the objective system 38 is a collimated beam. In that case the distance between diaphragm 48 and the focus of the sub-beam b'1 is equal to the distance between diaphragm 52 and the focus of the beam b'2. In that case the FTP for pinhole 50 is the same as the FTP for pinhole 52, because the intensity distribution of the sub-beams is symmetrically around their focal plane. The output signals of the photo diodes 56 and 58 are then equal. If the SUT area being measured departs from best focus, for example moves towards the objective system 38, the reflected beam b' leaving the objective system becomes a divergent beam and as a result the focus of the sub-beam b'1 and b'2 moves away from the lens 44 and 46, respectively. Thus, the focus of the sub-beam b'1 moves towards the pinhole 50, which results in an increase of the FTP, whilst the focus of the sub-beam b'2 moves away from the pinhole 54, which results in a decrease of the FTP. As a consequence the output signal of photo diode 56 becomes larger than the output signal of photo diode 58. It will be clear that the reverse will take place if the measured SUT area moves away from the objective system 38.

Figure 4:
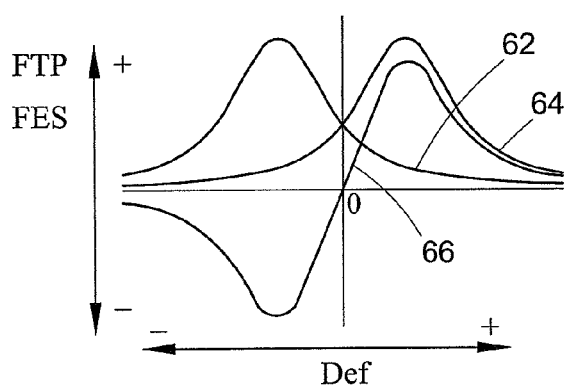
FIG. 4 shows graphs representing FTP's and the resulting FES graph for this sensor

This is illustrated in FIG. 4, wherein graph 62 and 64, respectively shows, in arbitrary unit, the FTP for pinhole 50 and pinhole 54, respectively as a function of defocus Def of the SUT area being measured.

FIG. 4 shows a third graph 66, which represents the focus error signal (FES) as a function of defocus Def. This signal, which is the electrical measuring signal, is obtained by subtracting the signal S1 supplied by photo diode 56 from the signals S2 supplied by photo diode 58, as indicated in FIG. 3 by means of the subtracting circuit 66. The focus error signal has a linear slope around its zero crossing point, i.e. where the SUT area is in focus, over a relative large range. This signal: FES=S2−S1 is indicative of the distance of the SUT area being measured relative to the focal distance of the objective system 38.

Preferably, the FES is processed to a normalized signal $FES_{norm}$ by dividing it by the sum of the photo diode signals. This can be realized by means of a summing circuit 68 and a dividing circuit 70 shown in FIG. 3. The normalized signal is thus:

$$FES_{norm}=(S_2-S_1)/(S_1+S_2)$$

This signal is independent of variations in reflectivity of the surface being measured. Normalization of the focus error signal also eliminates the influence of a number of other sources of noise and uncertainty on the measuring signal.

Up to now it was assumed that the surface area being measured was perpendicular to the measurement axis, i.e. the axis of the objective system. However the optical sensor should allow measurement of surface areas which are inclined at an angle alpha up to 5 degrees relative to the perpendicular plane, i.e. are at an angle of 90 degrees to 85 degrees to the said axis whilst the measurement uncertainty should remain within 35 nm. If the SUT area is inclined at an angle alpha, the cone of radiation that is reflected by that area en passes the objective system 28 has its axis tilted at an angle 2 alpha relative to the optical axis of the optical system. If the SUT area is in focus, the reflected radiation beam b' leaving the objective system is still collimated, but its chief ray will show an offset with respect to the chief ray at the radiation beam reflected from a perpendicular SUT area. This means that the intensity distribution of the beam reflected by a tilted SUT area is eccentric with respect to the pinholes 50,54. As a result, the FTP's passed by these pinholes decrease and this causes a decrease of the slope of the FES graph in FIG. 4. This phenomenon, which is inherent to the measuring method, will affect the required measuring accuracy.

The zero crossing of the FES graph would be stable; i.e. would not shift if tilting occurs, if the optical system of the sensor were perfect. However in practice this will not be the case. The optical components will show optical aberrations and manufacturing tolerances and the system alignment errors can not be excluded. Due to these aberrations and imperfections, the optical system will show slightly different focal lengths for different radiation paths, i.e. for different tilt of the SUT area. As a consequence tilting will also cause a shift of the zero crossing of the FES graph, which is a system inherent phenomenon.

The tilt- or inclination dependent errors (IDE) in the measuring signal caused by the two phenomena may increase the measurement uncertainty to an unacceptable level so that the sensor is not suitable for the required unconventional ultra fine measurement.

Means are provided to reduce the effects of tilt on the measuring result so that an optical sensor is obtained which allows said fine measurements to be made and satisfies the very small uncertainty requirement. This means samples the radiation distribution of the reflected measuring beam at or near to the pupil of the objective system 38 and uses a processor unit with a correction table for correcting the primary focus error signal, i.e. the signal from a conventional the optical sensor such as the sensor shown in FIG. 3. This sampling means will be called pupil sensor.

Figure 5:
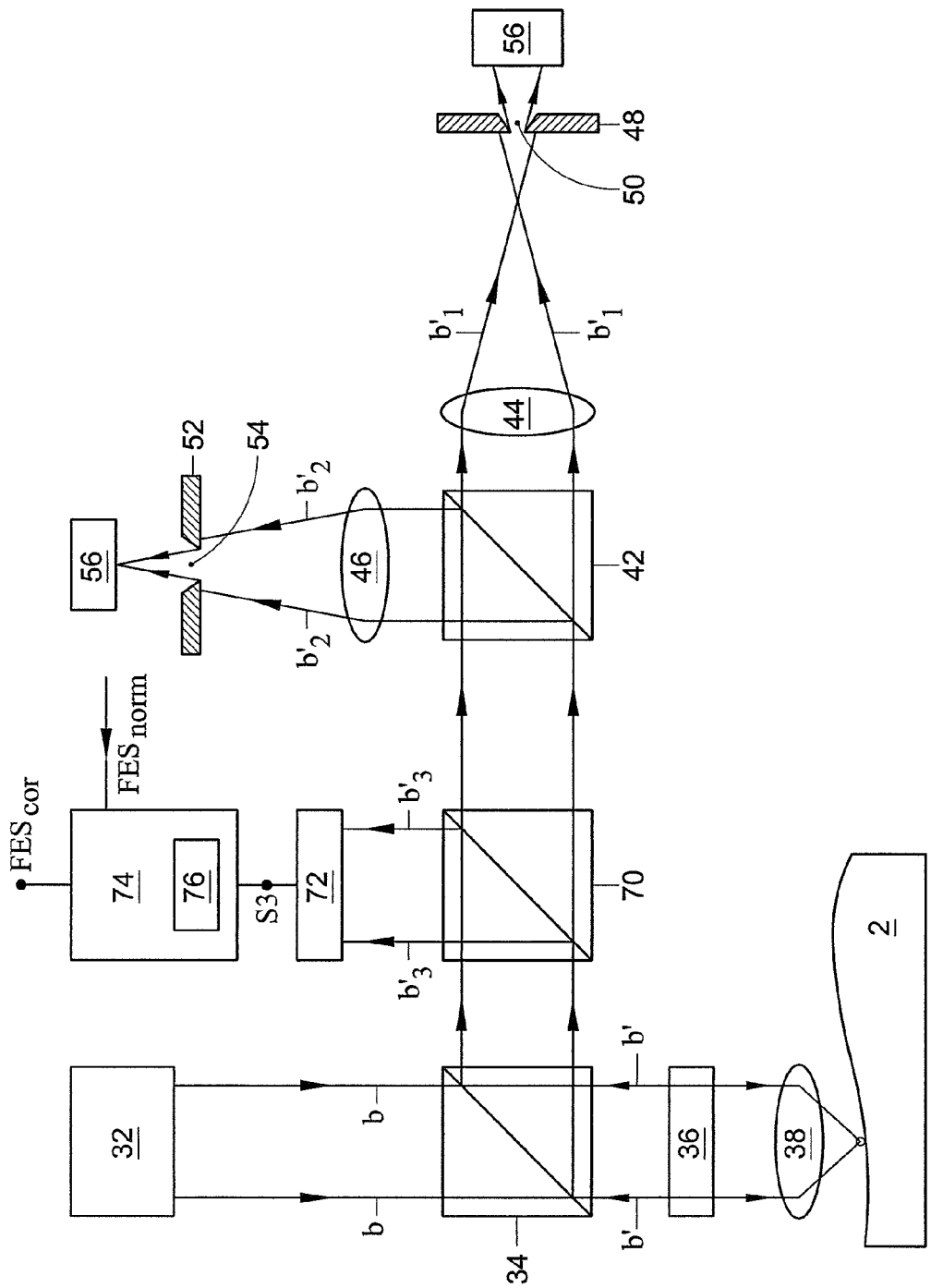
FIG. 5 shows a diagram of a differential confocal sensor, which comprises a pupil sensor.

FIG. 5 shows an implementation in a differential confocal sensor. In this Figure, the components, which are the same as in FIG. 3, have the same reference numerals. In addition to these components, the optical sensor of FIG. 5 comprises an additional beam splitter 70 arranged at a position where the reflected measuring beam b' is a collimated beam, at least for the null-position, or in-focus position of the SUT 2. Beam splitter 70 reflects a small portion of the radiation of beam b' as a new beam b'$_3$, to a two-dimensional position-sensitive detector 72. Preferably, this detector is a two-dimensional lateral effect photo diode, which is known as PSD. In a PSD the intensity distribution of an incident radiation spot is physically integrated to continuously provide a position signal. This type of detector is preferred, because of its integration principle and because it combines a low rise time of the order of a few microseconds and a linear response of the order of 0.5% over a large range. The PSD, together with proper signal processing electronics, produces three voltages, which represent an X coordinate, an Y coordinate and the intensity of the incident radiation. The X- and Y-coordinate are indicative of the portion of the system aperture that is used by the reflected measuring beam b' and will allow correction of the varying error, which is caused by different propagation paths of the reflected measuring beam for different tilts of the SUT.

The beam splitter 70 may be a tilted plate type, like a semi-transparent plan parallel plate or wedge plate, abeam splitting cube, as shown in FIG. 5, both of the neutral or polarizing type, a diffraction beam splitter or any other type. Although a PSD is preferred for the position detector 72, also another two-dimensional detector like a CCD sensor or CMOS sensor may be used.

The output signals S$_3$ of the PSD are supplied to a processor unit 74 for further processing. This unit employs a correction/calibration table, which is indicated symbolically by element 76 in FIG. 5.

During a measurement cycle, i.e. measurement of a SUT at least the center of the intensity distribution of the reflected measuring beam b' is continuously determined, whereby a direct and clear indication of the momentary inclination of the SUT is obtained. The measured value is very strongly related to inclination and is hardly dependent on small deviations of the position of the SUT from its null-position, or in-focus position. In the processor unit 74 the measured values are used as a correction table for the primary distance measuring values, i.e. the values of the signal FES$_{norm}$, which signal is supplied to the processor unit 74, as shown in FIG. 5. By proper calibration of all possible SUT inclinations, a user firstly can make a correction/calibration table. During the measurement itself this table is used to correct the primary signal FES$_{norm}$ so that the corrected signal FES$_{cor}$ is obtained. For carrying out this numerical correction software can be used. It is also possible to perform the correction by means of hardware and in real time, for example by using a look-up table furnished by the manufacturer of the optical sensor.

The inclination error correction provides the following substantial advantages:

The correction is performed faster and in cheaper way compared with the method wherein the measuring beam is tilted back to the system axis by means of an actuated mirror, as is disclosed in the U.S. Pat. No. 5,424,834.

The correction by means of calibration solves not only the problem of inclination of the object surface, but also substantially reduces or eliminates the influence of aberrations or manufacturing tolerances or alignment errors of system optical elements on the measurement result.

The correction can be implemented in both null-sensors and in height-sensors. A null-sensor is understood to mean a sensor that allows measuring or detecting a certain vertical point (reference point) with high accuracy and that usually also is capable to indicate whether a SUT area is higher or lower than a reference point. A height-sensor is understood to mean a sensor that allows measuring a range of vertical positions of a SUT with high precision.

By using the novel type of correction the accuracy of an optical probe may be improved either to the highest degree of accuracy or to a high accuracy at low cost. In any case, the accuracy of any conventional optical sensor can be improved by at least a factor 10. So, tilt error correction can be used to improve a low-cost null-sensor so that this sensor has not only a substantially better accuracy at the null-point, but also an acceptable accuracy over a limited range around the null-point. In other words, a low-cost null-sensor can be converted into a height-sensor showing an acceptable performance. Alternatively, the correction can also be used in a high quality height-sensor, which already has very high accuracy, to further improve this high quality with a factor 10 or more.

The novel type of correction may also be extended to correct for roughness of the SUT. In this case, the position-sensitive sensor determines not only the center of the radiation distribution of the reflected measuring beam b', but also the distribution pattern and its size. This can be realized by using for the position-sensitive sensor a CCD or a CMOS sensor. A rough SUT causes the reflected measuring beam to comprise not only speculary-reflected components, but also components scattered in different degrees. By measuring the compound intensity distribution of the reflected measuring beam from several roughness samples by means of the pupil monitor and carrying out calibration, the primary distance measuring signal can be corrected for roughness of the SUT.

The novel type of correction also allows correction for variations in curvature of a glossy SUT. Such variations cause deviations in the intensity distribution of the reflected measuring beam and thus affect the measured signal, especially of height-sensors. By measuring the intensity distribution of the reflected measuring beam from several samples showing different curvatures by means of the pupil monitor and carrying out calibration, the primary distance measuring signal can be corrected for curvature variations of the SUT.

The differential confocal sensor, which has been used to elucidate the correction by means of the pupil monitor and calibration, is only one example of a sensor wherein this novel correction can be used. In principle, the correction can be used in any optical sensor wherein a measuring beam reflected by a surface to be measured passes through the same objective system that has formed a measuring spot on the surface and is incident on a radiation-sensitive detection system. In all these types of optical sensor a pupil monitor can be included to receive a portion of the reflected beam in a similar way as in the differential confocal sensor.

A first type of optical sensor wherein the correction may be implemented is an astigmatic focus detection system. In this system an astigmatic element, for example a cylinder lens, is arranged in the path of the reflected beam so that the beam has two astigmatic focal lines at different axial positions. The radiation-sensitive detection system comprises a four quadrant detector and is arranged midway the focal line positions. The shape of the spot formed on the detector changes if the distance between the objective system and the object surface and the measuring signal is obtained by subtracting output signals from diagonally positioned detector elements. An astigmatic optical sensor is described in the paper: "Surface Profile Measurement with a Dual-Beam Optical System" in Applied Optics, 23, 746 (1984).

A second type of optical sensor which can be improved by the novel correction uses the Foucault focus detection method and is described in the paper: "Video Disk Player Optics" in Applied Optics, 17, 1993 (1978). This type of sensor uses a knife-edge arranged at the in-focus position of the reflected measuring beam and two photo diodes arranged behind the knife-edge and at different sides of the optical axis. By subtracting the output signals of the photo diodes a signal proportional to the distance between the object surface and the objective system is obtained.

In the paper: "High precision optical surface sensor" in Applied Optics, Vol. 27, No. 1, p 103 (1988) an optical sensor is described that uses the critical angle method of total reflection. A change in variation of the convergence or divergence of the reflected measuring beam is "translated" by a total reflection prism into variation of radiation fluxes towards two photo diodes. Also this sensor can be improved by the novel correction.

Also in chromatic optical sensor, wherein a chromatic objective lens is used for distance measurement the novel correction can be used. A chromatic sensor is described in, for example European Patent 1647799 and the recent PCT patent application WO 007051567.

It should be noted that the enumeration of optical sensor, which may be improved, is not limitative.

A confocal sensor, thus also the sensor with enhanced accuracy and decreased uncertainty has a limited measuring range. For the required resolution the measuring range is in the order of microns. This range can be enlarged by mounting the objective system, for example a single lens, on mechanical guidance means and move the lens axially over a range of, for example 5 mm around an initial position, to maintain focus over this range. This is illustrated in FIG. 6.

Figure 6:
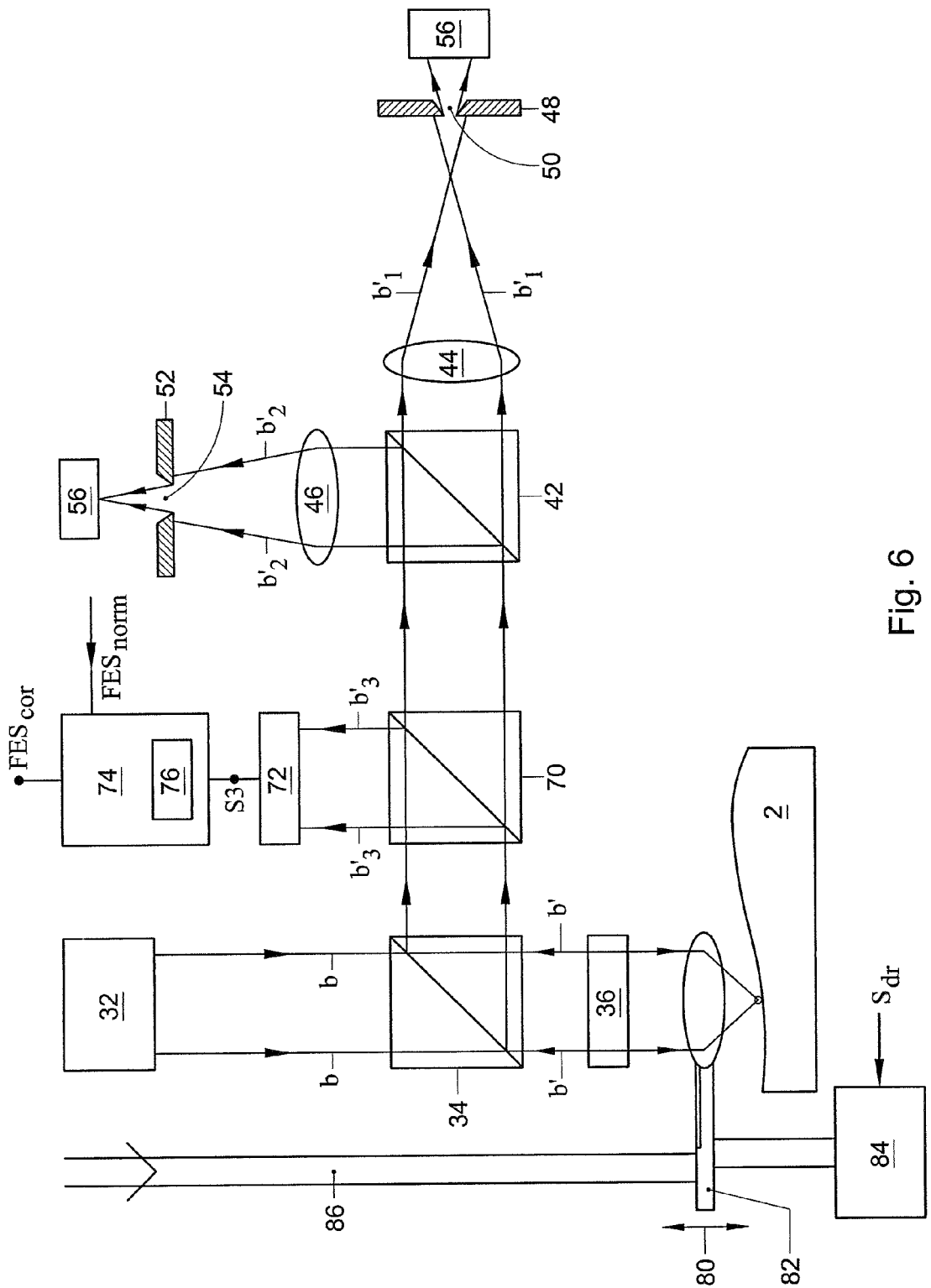
FIG. 6 shows a diagram of such a sensor having an extended measuring range.

As shown in FIG. 6 by means of the double arrow 80, the objective lens can be moved up and down in the axial direction by means of an actuator 84. A servo loop for controlling this actuator is obtained by supplying the distance-measuring signal $FES_{cor}$ to a control algorithm, which provides a drive signal $S_{dr}$ for the actuator. At the same time the translation of the objective lens should be measured. To realize such measurement a mirror 82 is fixed to the objective lens and an interferometer system is used to measure the position of this mirror and thus of the objective lens. For clearness sake, in FIG. 6 it is pictured that the actuator moves the mirror 82, whilst in reality the actuator will move the objective lens holder. The range of movement of the objective, i.e. the measurement range may be extended to considerably more than the above mentioned 5 mm. In principle the coherence length of the laser beam determines the upper limit.

Preferably, the interferometer system is a heterodyne system, which uses a laser beam that has two mutually perpendicular polarized beam components, one of which constitutes the measuring beam and the other a reference beam. A heterodyne interferometer system is well known to a person skilled in the art and does not need further explanation. In FIG. 6 only the interferometer beam 86 is shown. This type of interferometer system was chosen for this application, because it shows an ideal combination of properties, namely a high resolution and a very large and high bandwidth. Furthermore, its ads no friction or stiffness to the optical sensor.

By extending the measuring range of the optical sensor by means of the mirror fixed to the objective lens and the interferometer system, hardly any moving mass is added. Since the objective lens may have a low weight, for example of the order of tenth of a gram, a high bandwidth for the mirror control system may be realized. By combining this with a low-weight and low-hysteresis guidance for the objective lens and a suitable actuator 84, the axial translation of the objective lens can be controlled such that the focus error can be limited to minimum. This is an important feature, because the IDE will be minimal in best focus, even for an optical sensor wherein the novel correction is used.

An important aspect in developing of the high-resolution and high accuracy optical sensor, which has a movable objective system, relates to its compactness and stability. A concept for the optical sub-system of beam splitter and reflecting elements for guiding the sensor beam to and from the SUT and guiding the interferometer beam to and from the mirror fixed to the objective system allows designing a number of such sub-systems having a minimum number of components and wherein the sensor beam and the interferometer beam are stable relative to each other. The new subsystems have in common that these beams share the main components, which are the polarizing beam splitter and the quarter wave plate. A main feature of these sub-systems is that a reflecting element, which is needed to reflect the interferometer beam after it has been reflected a first time by objective mirror back to this mirror, is adapted such that it can transmit the sensor beam.

Figure 7:
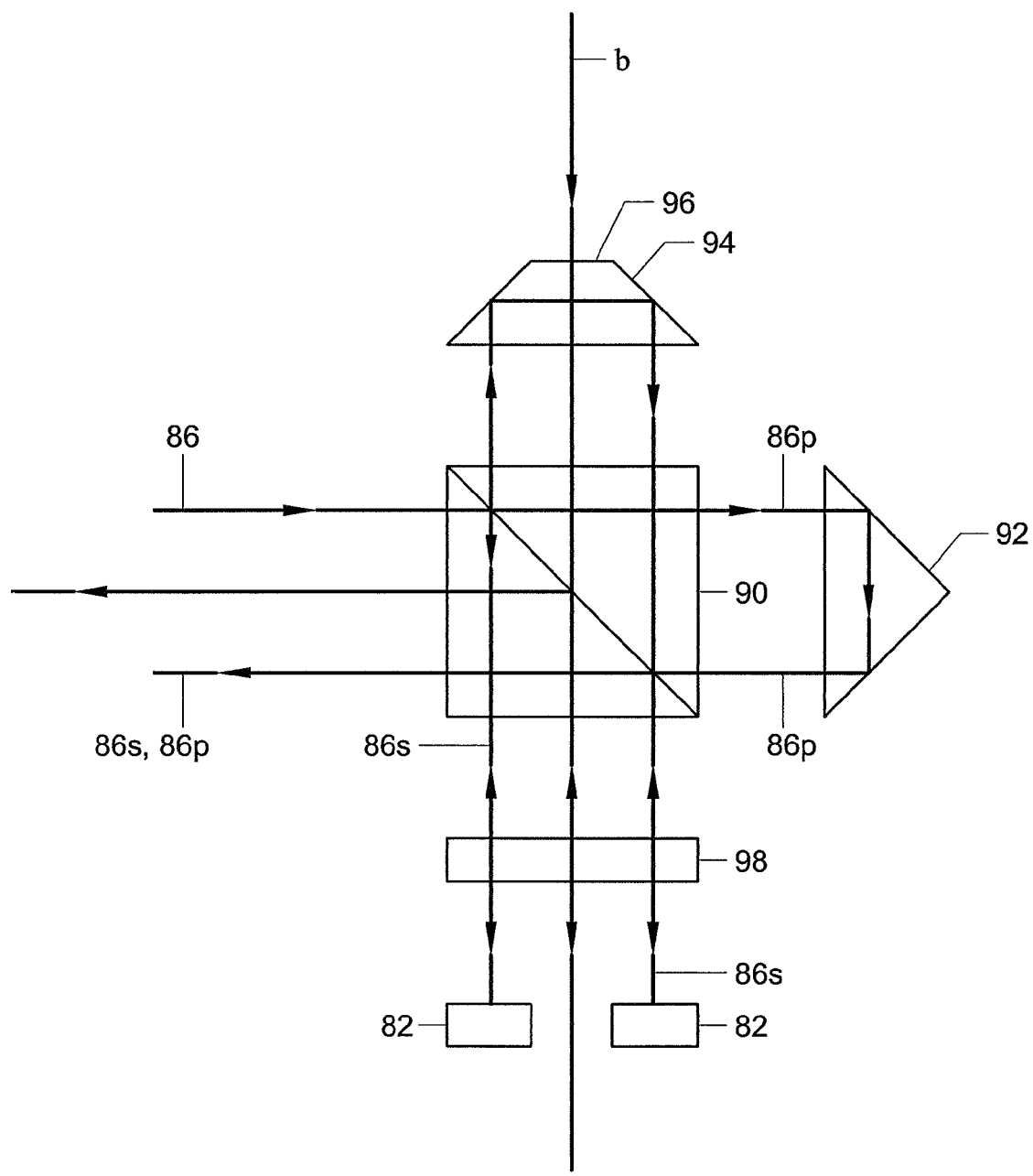
FIGS. 7-15 show different embodiments of a sub-system for use in such a sensor

FIG. 7 shows a first embodiment of the new sub-system, which comprises a polarizing beam splitter 90, a quarter wave plate 98 and two retro-reflectors 92 and 94 for reflecting an incident interferometer beam in the same direction as the incident beam. The interferometer system is a heterodyne system and the interferometer beam 86, which enters the sub-system at the left side, comprises two mutually perpendicular beam components, usually called s and p components. One of these components, sub-beam 86s is reflected by the polarizing beam splitter (PBS) 90 downward to the mirror 82, which is fixed to the objective system. This mirror reflects the sub-beam back to the PBS 90. Between the PBS and mirror a quarter wave plate 98 is arranged, which polarization direction is at 45 degrees with respect to the polarization direction of sub-beam 86s. On its way to and from the mirror 82 the sub-beam 86s has passed the plate 98 twice so that its polarization direction has been'rotated over 90 degrees before it re-enters the PBS. The sub-beam 86s passes the PBS and enters a retro-reflector 94 shaped as cube corner prism or right angle prism. After reflection at the left and right side surfaces of prism 94 the sub-beam 86s propagates downward in a direction parallel to the direction of the sub-beam incident on the prism 94. It passes the PBS and is incident for a second time on mirror 82. The mirror reflects the sub-beam 86s upward to the PBS 90. When reaching the PBS, the polarization direction of sub-beam 86s has been rotated over 90 degrees, because it has passed again twice the quarter wave plate 98. This sub-beam is then reflected by the PBS in the left direction toward a radiation-sensitive detector (not shown) of the interferometer system.

The other component of the interferometer beam 86, sub-beam 86p has such polarization direction that it is passed by the PBS towards a retro-reflector 92 in the form of a corner cube or right-angle prism. This prism reflects sub-beam 86p parallel to the incident beam so that it passes the PBS a second time to leave the sub-system at the left side. The sub-beam 86p then travels to the same radiation-sensitive detector as sub-beam 86s to interfere with the latter. Upon movement of the mirror 82 the interference will be periodically constructive and destructive, which results in a periodic electrical signal from the said detector.

Usually the retro-reflector 94 has the same shape as retro-reflector 92, i.e. a triangular cross-section. The upper side of reflector 96 is flattened so that it has a plane surface area 96. This allows the optical sensor beam b to enter the sub-system via this prism so that the sensor beam can use PBS 90 and quarter wave plate 98 which are also used by the interferometer beam 86. On its way to the SUT (not shown in FIG. 7, but below the mirror 82) the sensor beam b passes the PBS 90. After it has been reflected by the SUT it is reflected by PBS, because it polarization direction has been rotated over 90 degrees, due to double passage of the quarter wave plate 98. The reflected sensor beam b' leaves the sub-system at the left side and travels to the detector branch of the optical sensor shown in FIGS. 5 and 6.

In the embodiment of FIG. 7 and the following Figures the paths of the interferometer beam 86 and the sensor beam b may be inverted, because of the symmetry of the sub-system. For FIG. 7 this means that the interferometer beam enters at the lower area of the left side surface of the PBS and leaves at the higher area of this surface and that the sensor beam enters via the left side surface and leaves via the plane area 96 of prism 94.

Figure 8:
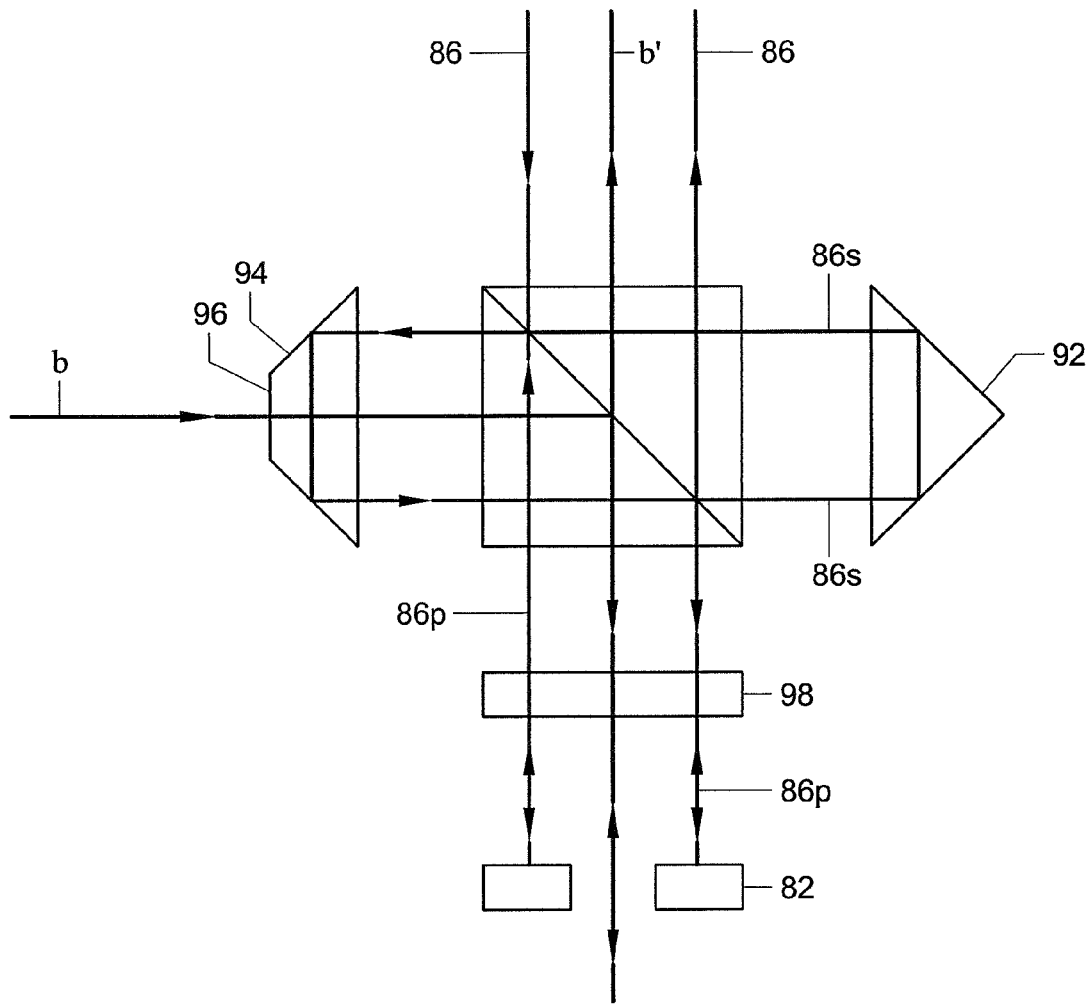

FIG. 8 shows a second embodiment of the new sub-system. This embodiment differs from that of FIG. 7 in that the knotted retro-reflector 94 is arranged at the left side of polarizing beam splitter 90 so that the sensor beam b enters from (or leaves to) the left side. The interferometer beam 86 enters from (or leaves to) the upper side. The sensor beam b and the interferometer beam 86 are reflected and their polarization directions are rotated in a similar way as in the embodiment of FIG. 7. In the embodiment of FIG. 8 the interferometer beam component 86p is the measuring beam and the beam component 86s is the reference beam. The arrows in the beams indicate the paths followed by these beams.

Figure 9:
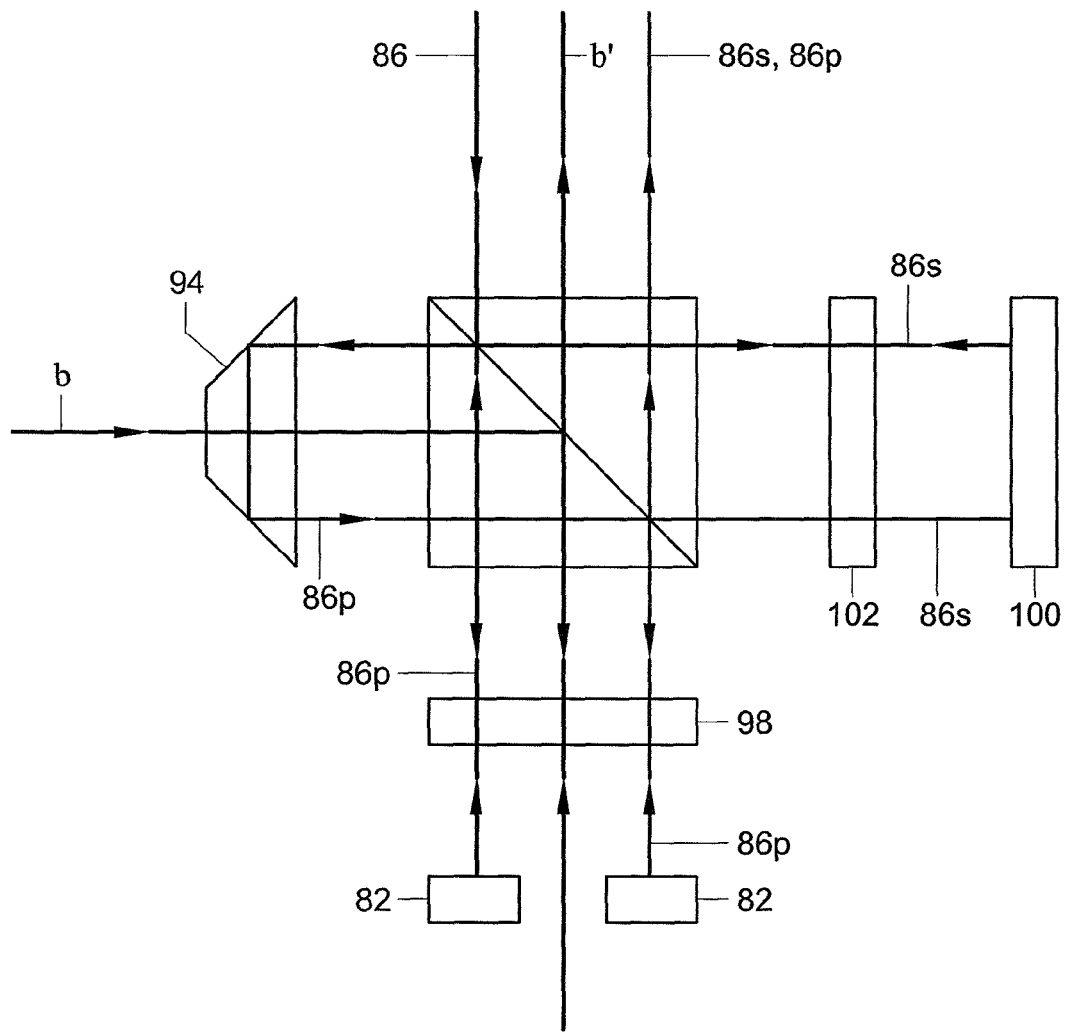

The embodiment shown in FIG. 9 treats the sensor beam b and the interferometer beam component 86p, i.e. the measuring beam in the same way as the embodiment of FIG. 8. The reflecting prism 92 for the interferometer reference beam 86s in FIG. 8 is replaced by a plane mirror 100. Since this mirror reflects a perpendicularly incident beam coaxial with the incident beam a further measure is needed to realize coincidence of the reflected interferometer beam components when they leave the sub-system. This measure consists of arranging a further quarter wave plate 102 between PBS 90 and mirror 100. The lamda/4 plate ensures that the polarization direction of sub-beam 86s is rotated over 90 degrees when this sub-beam travels to the mirror 100 and back to PBS 90 so that this sub-beam passes through PBS 90 towards the reflector 94. After reflection by this reflector the sub-beam 86s passes PBS 90 again to be reflected a second time at mirror 100 towards PBS. When sub-beam 86s arrives at PBS 90 its polarization direction has again been rotated over 90 degrees so that PBS 90 reflects it coaxial with the measuring beam 86p.

Figure 10:
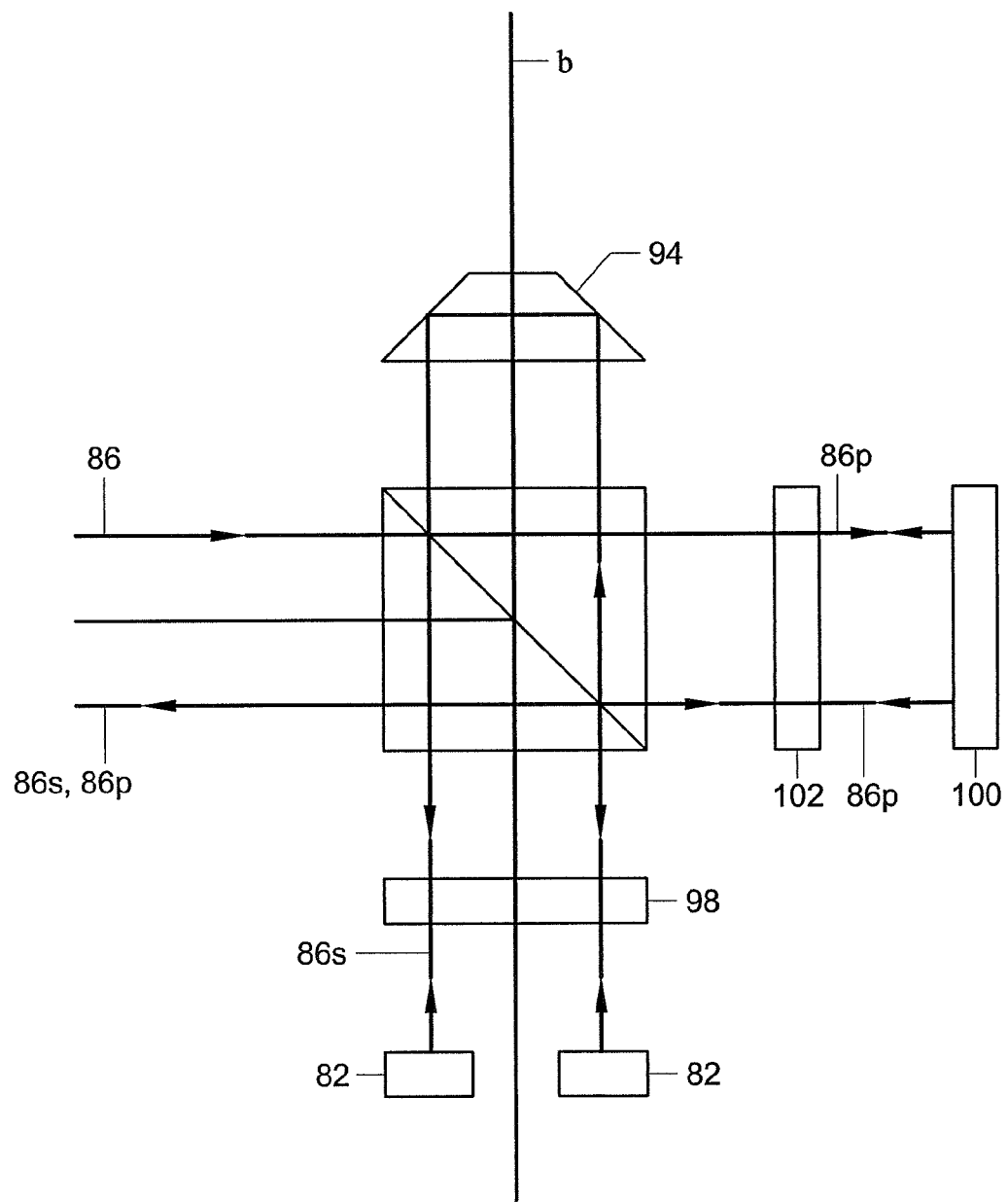

Also in the embodiment of FIG. 7 the reflector 92 can be replaced by a plane mirror 100 and a quarter wave plate 102 so that the embodiment shown in FIG. 10 is obtained. In this embodiment the interferometer reference beam, in this case beam component 86p passes and is reflected by the same components as the interferometer reference beam 86s in the embodiment of FIG. 9. In view of the description of FIGS. 7 and 9, FIG. 10 needs no further explanation.

Figure 11:
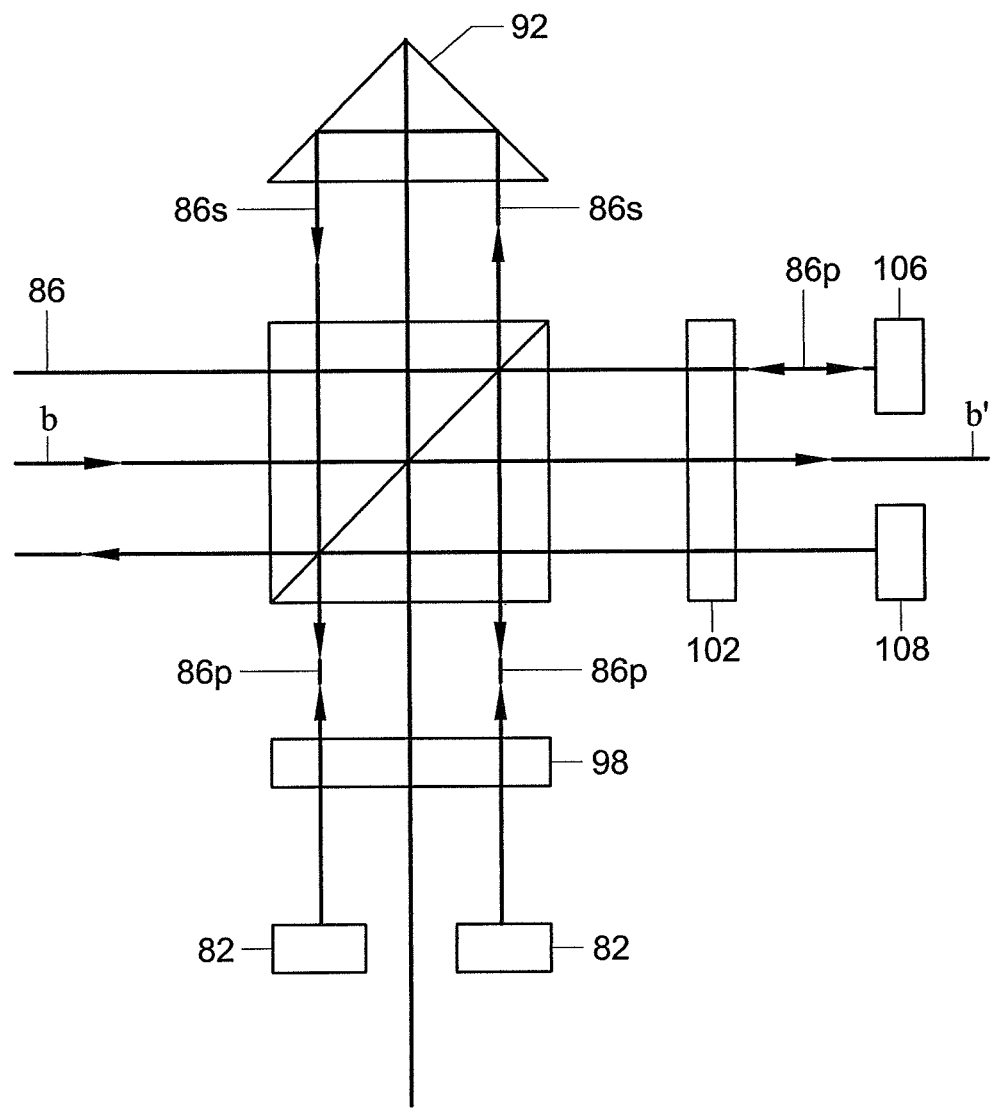

FIG. 11 shows an embodiment of the new sub-system wherein the interferometer measuring beam and the sensor beam b share not only PBS 90 and lamda/4 plate 98, but also the reflector 92. The beam splitting plane of the PBS is rotated over 90 degrees with respect to this plane in the preceding embodiments. The interferometer measuring beam 86p incident from the left is passed by PBS 90 towards a mirror 106, reflected by this mirror and than reflected by the PBS (due to lamda/4 plate 102) to the objective mirror 82. The beam reflected by this mirror reaches via PBS 90 the reflector prism 92, which reflects the beam to the objective mirror 82. This mirror reflects the beam to the PBS to a second mirror 108 at the right side and the mirror 108 reflects the beam to PBS. Due to the presence of lamda/4 plate 102, PBS passes the beam so that it can leave the sub-system at the left side. The interferometer reference beam 86s is first reflected by PBS 90, then reflected by reflector prism 92 and finally reflected by PBS 90 to leave the sub-system. The sensor beam b incident from the left is first reflected by PBS 90 to the reflector prism 92. This prism reflects the sensor beam while rotating its polarization direction so that it can pass PBS 90 to reach the SUT (not shown). The reflected sensor beam b' reaches the PBS with a polarization direction again rotated over 90 degrees, due to double passage of lamda/4 plate 98, so that it is reflected to the right side and leaves the sub-system via a window 110 between the mirrors 106 and 108.

Figure 12:
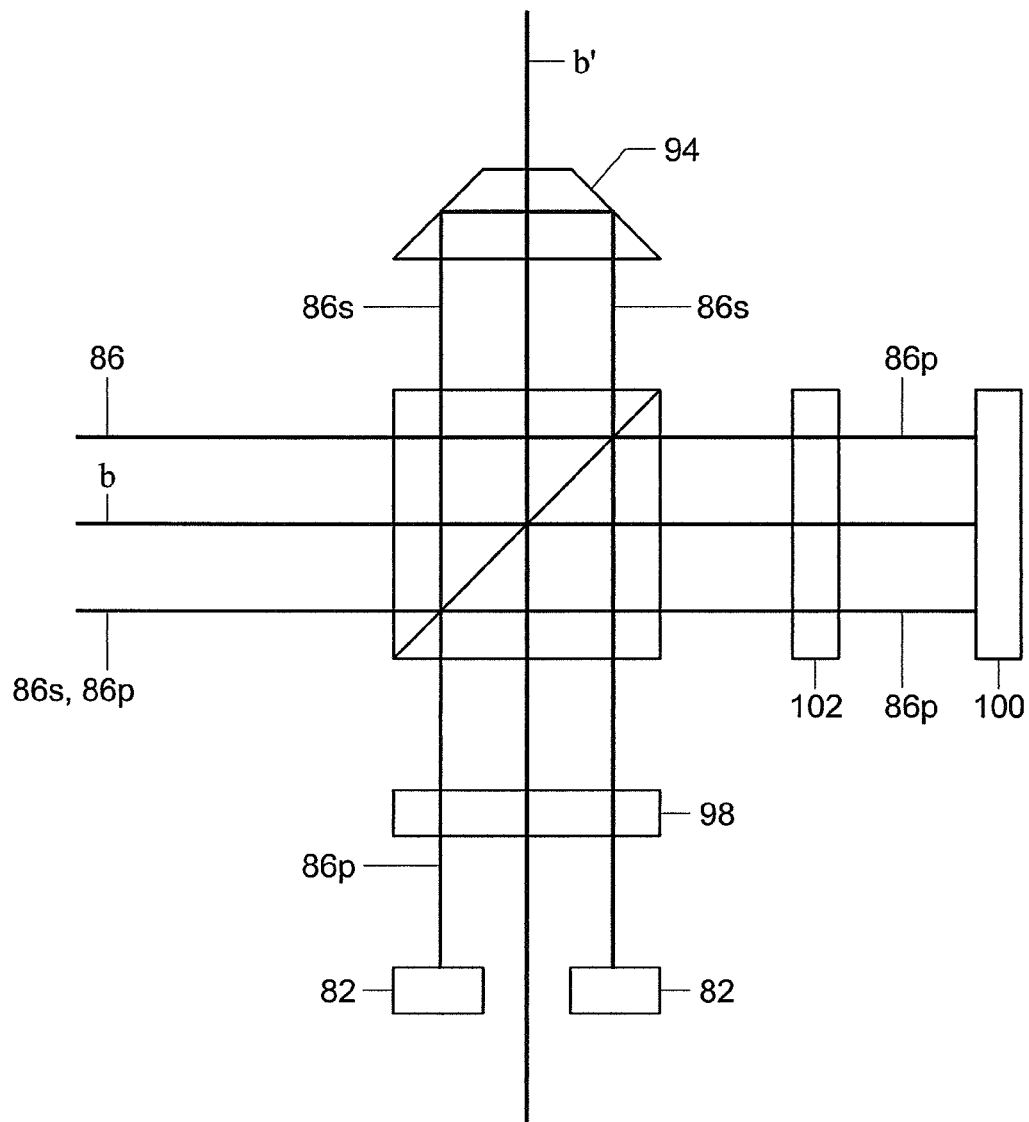

In the embodiment shown in FIG. 12 the sensor beam b and the interferometer measuring beam 86p share mirror 100 and lamda/4 plate 102. Sensor beam b first travels to the mirror 100, then back to PBS 90 and then is reflected by the PBS to the SUT. The sensor beam reflected by the SUT passes PBS 90 and leaves the sub-system via prism 94. The interferometer reference beam 86s propagates the sub-system via a first reflection by PBS 90, reflections in the prism 94 and a second reflection by PBS 90. The interferometer measuring beam 56p propagates the sub-system in a similar way as in the embodiment of FIG. 10, so via a first refection at mirror 100, a first reflection at the objective mirror 82, reflections in the prism 94, a second reflection at the objective mirror 82 and a reflection at mirror 100 to leave the subsystem at the left side.

Figure 13:
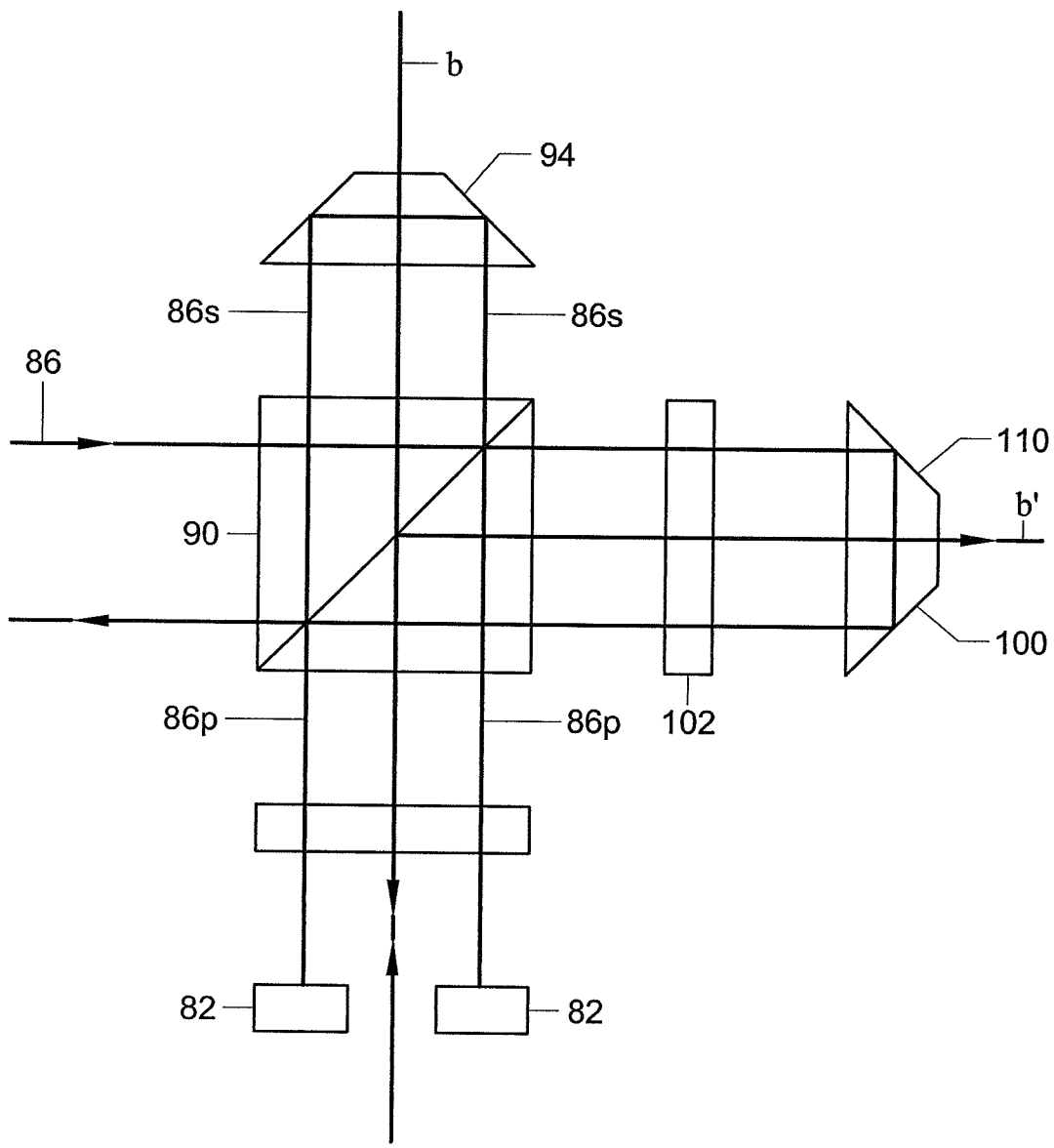

The embodiment shown in FIG. 13 employs two knotted prisms 94 and 110 so that the sensor beam b may enter via one of the prisms, for example prism 94 and, after reflection at the SUT, leave the sub-system via the other prism 110. The interferometer reference beam 86s follows the same path as in the embodiment of FIG. 12. The interferometer measuring beam 86p propagates the sub-system via passage of PBS 90, first reflections at prism 110, reflection by the PBS, reflection at the objective mirror, passage of the PBS, reflections at prism 94, passage of the PBS, second reflection at the mirror objective, reflection by the PBS, second reflections at prism 110 and passage of the PBS to leave the sub-system at the left side.

Figure 14:
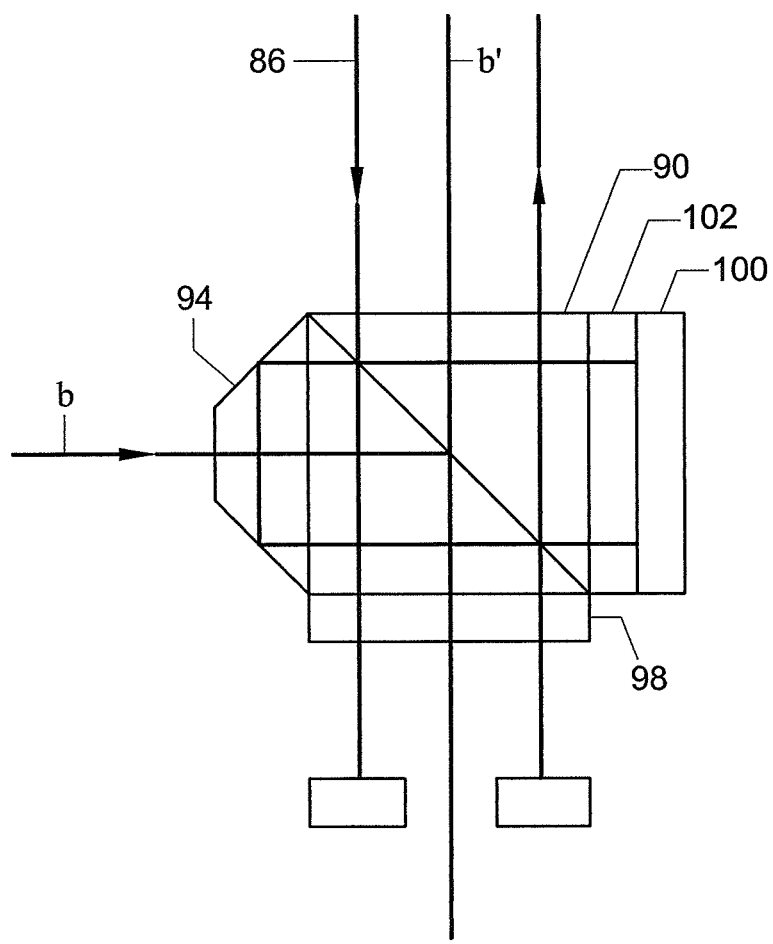
Figure 15:
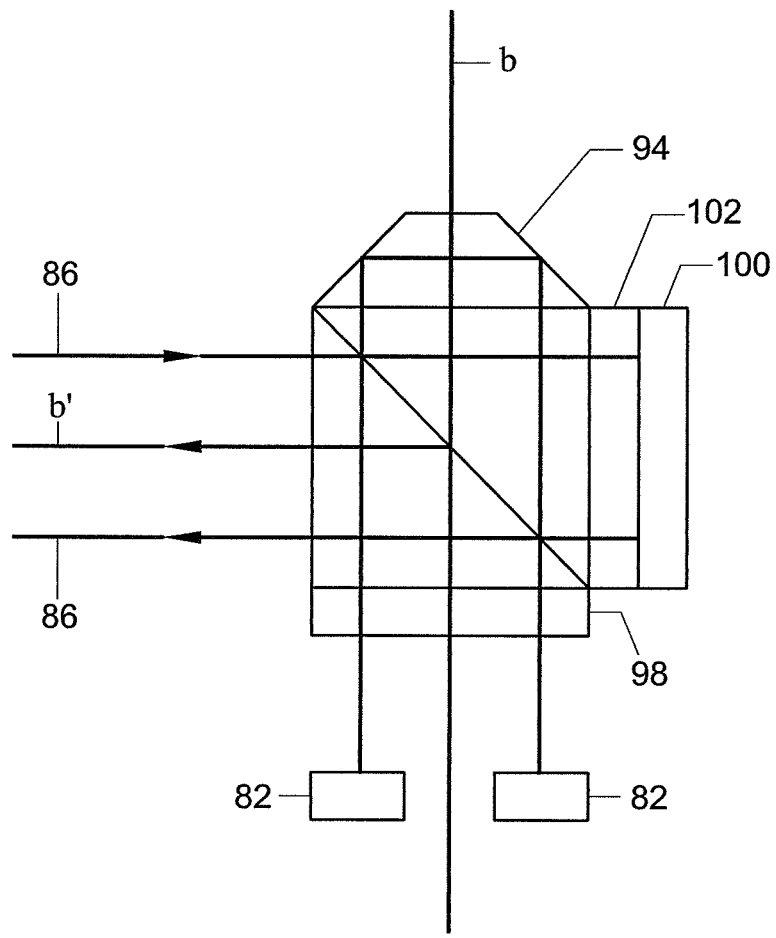

FIG. 14 shows a first preferred embodiment of the novel sub-system. The design of this sub-system is the same as that of FIG. 9, but all components are now cemented together, so that the chance that unwanted reflection at surfaces is reduced to the minimum. The same holds for the embodiment of FIG. 15, which shows the same design as FIG. 10. FIGS. 14 and 15 will be clear without further explanation.

The concept of the novel sub-systems shown in FIGS. 7-15 is a general concept and can be used not only in a confocal optical sensor, but in any other optical sensor that employs a moving objective system and an interferometer to keep track of the displacement of the objective system.

The performance of a differential confocal sensor can also and to a higher degree be improved by using a further insight in the cause of limited performance and the remedy to reduce the effect of the relevant cause.

Figure 16:
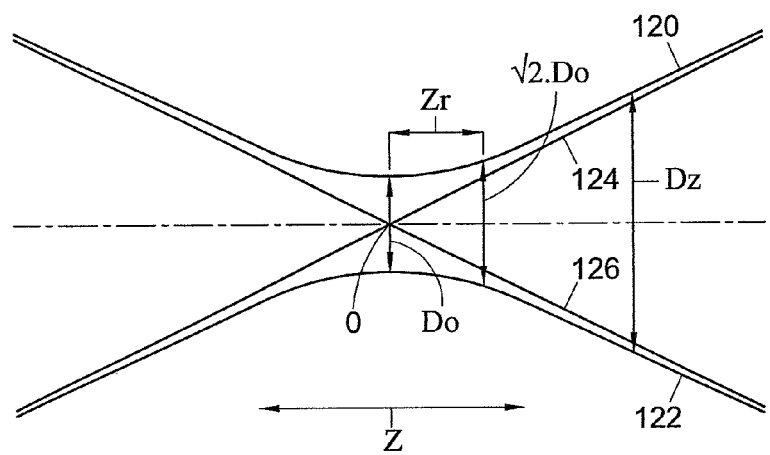
FIG. 16 shows the intensity distribution in the beam waist region of a Gaussian radiation beam.

For understanding this aspect, one should consider the behavior of the Gaussian laser beam used as the measuring beam in the differential confocal sensor. Near its focus a focused laser beam does not follow the laws of geometric optics, but the laws of diffractive optics. The diameter of the radiation distribution does not reduce to zero, because the intensity would be then infinite high, but the beam contracts to a distribution with finite size and intensity and then expands again. This is illustrated in FIG. 16. Since in focus the radiation distribution is the Fourier-transform of the far field distribution, both the shape and the size of most radiation distribution, for example a top-hat distribution, will change along the optical axis. A Gaussian radiation distribution has the special property that under Fourier-transform its shape is maintained. This is the reason for preferably using a laser operating in the TEM00 mode, which provides a Gaussian distribution, in the confocal optical sensor. Thereby a smooth change in radiation intensity transfer through the pinholes, with only one breakpoint at each side of focus is obtained if the SUT moves through focus. This results in a near constant sensitivity over a large range.

With respect to FIG. 16, the diameter of the intensity distribution for a Gaussian beam scales with the position along the beam axis and is defined by the diameter at the position where the intensity is $e^{-2} \approx 0.135$ times the central intensity. The curved lines 120 and 122 in FIG. 16 represent the $e^{-2}$ border of the beam, whilst the straight lines 124 and 126 are the borderlines as predicted by geometric optics. The latter lines form the asymptotes for the curved lines 120 and 122. The beam region where the beam has its smallest diameter is called the beam waist and the smallest diameter is called the beam waist diameter: $D_0$. The beam waist region extends over a distance along the beam axis defined by the z (=axial) positions where the $e^{-2}$ diameters are $\sqrt{2}$ times the beam waist diameter $D_0$. This distance is called the Rayleigh distance, which is usually denoted by $z_r$.

In a differential confocal system two pinholes are arranged in two Gaussian beams near focus, which pinholes are followed by photo diodes. The photodiodes measure the radiation power or intensity passed by the pinholes, herein above called fractional transferred power (FTP) and convert the intensity in electrical signals SPD1 and SPD2. The FTP is a measure for the defocus of the surface under tests (SUT). Usually the photo diode signals are processed to a normalized signal, which is called herein above focus error signal FES which is given by: FES=(SPD1−SPD2)/(SPD1+SPD2). This FES is insensitive to a number of error sources.

However, inclination of the SUT causes errors (inclination dependent errors or IDE) in the measurement result. As described herein above the measuring result can be compensated for IDE by means of the pupil monitor or sensor. This is true for system dependent errors, i.e. insufficiencies in the optical system itself of the sensor, like optical aberrations or manufacture tolerances of system components or assembling errors, for example alignment errors. Now, it has been recognized that there is also a second type of IDE, which can not be corrected by means of the pupil monitor and which become important if higher measuring accuracy is required. The second type of IDE is inherent to the configuration of the optical system, which is determined by measuring principle. The configuration inherent error is caused by the relative shift of the measuring beam relative to the centers of the pinholes if the SUT is inclined as shown in FIG. 17.

Figure 17:
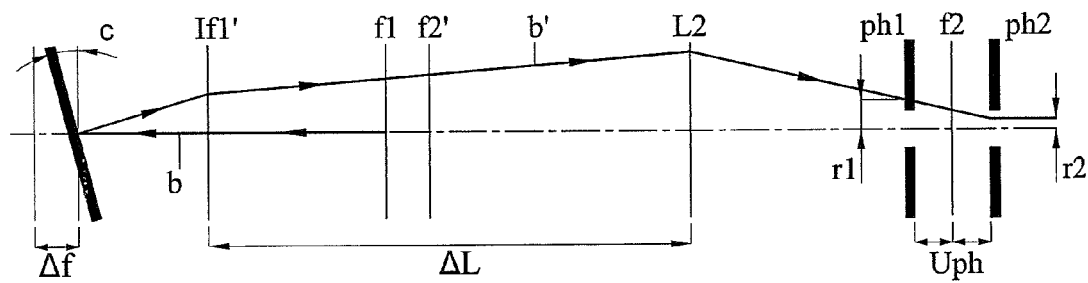
FIG. 17 shows a measuring beam shift caused by a tilted object.

FIG. 17 shows an inclined SUT 2 the system lenses $L_1$, $L_2$ and their focal planes. The pinholes, which in reality are arranged in different branches, are indicated by $ph_1$ and $ph_2$, and $f_2$ is the focal plane in case of a not inclined SUT in focus. $f_2$ is midway the axial positions of the pinholes. The offset of the beam, caused by an inclined SUT, at the position of pinhole $ph_1$ and $ph_2$ are indicated by $r_1$ and $r_2$, respectively. The axial distance between a pinhole and $f_2$ is indicated by $u_{ph}$. It has been found that the offset r is a function of SUT inclination, defocus and system parameters and can be deduced from these by means of goniometric relationships. This offset, together with the size of the focused spot at a pinhole and the pinhole diameter determines how large the error in laser intensity passing through the relevant pinhole will be. The recognition that the magnitude of the second type of IDE is dependent on pinhole parameters (diameter and distance to $f_2$), beam properties and focal lengths leads to new tool to improve the differential confocal sensor, minimize the second type of IDE by determining the optimum parameters for this specific purpose.

By determining a suitable pinhole diameter $D_{ph}$ and a suitable distance $u_{ph}$ between the pinhole and $f_2$, the deviation, due to the radial offset r of the measuring beam, of the FTP at pinhole 1 is compensated by the deviation of the FTP at pinhole 2 when the photo diode signals are processed according to the FES formula. For general application of this tool, the system parameters can be dimensionless by normalizing them with local beam properties so that an expression for minimum system configuration IDE can be derived that is independent of specific system parameters such as lens parameters, beam diameters etc.

The normalized, i.e. dimension less, pinhole diameter is given by:

$$D_{ph\_dl} = D_{ph}/D_0$$

and the normalized distance between a pinhole and best focus is given by:

$$u_{ph\_dl} = u_{ph}/z_r$$

The configuration inherent IDE may still show some difference for sensor systems having different parameters, but the area where this IDE is near to zero is system independent. The best combination of pinhole diameter and pinhole distance to best focus that results in minimum IDE for $D_{ph-dl}$ within the range from 0 to 2 and $u_{ph\_dl}$ within the range from 0 to 3 can be approximated by the following $5^{th}$ degree polynomial:

$$u_{ph\_dl} = 1.0196 + 0.0336 D_{ph\_dl} + 0.2832 D_{ph\_dl}^2 + 0.5876 D_{ph\_dl}^3 - 0.4033 D_{ph\_dl}^4 + 0.0763 D_{ph\_dl}^5$$

Figure 18:
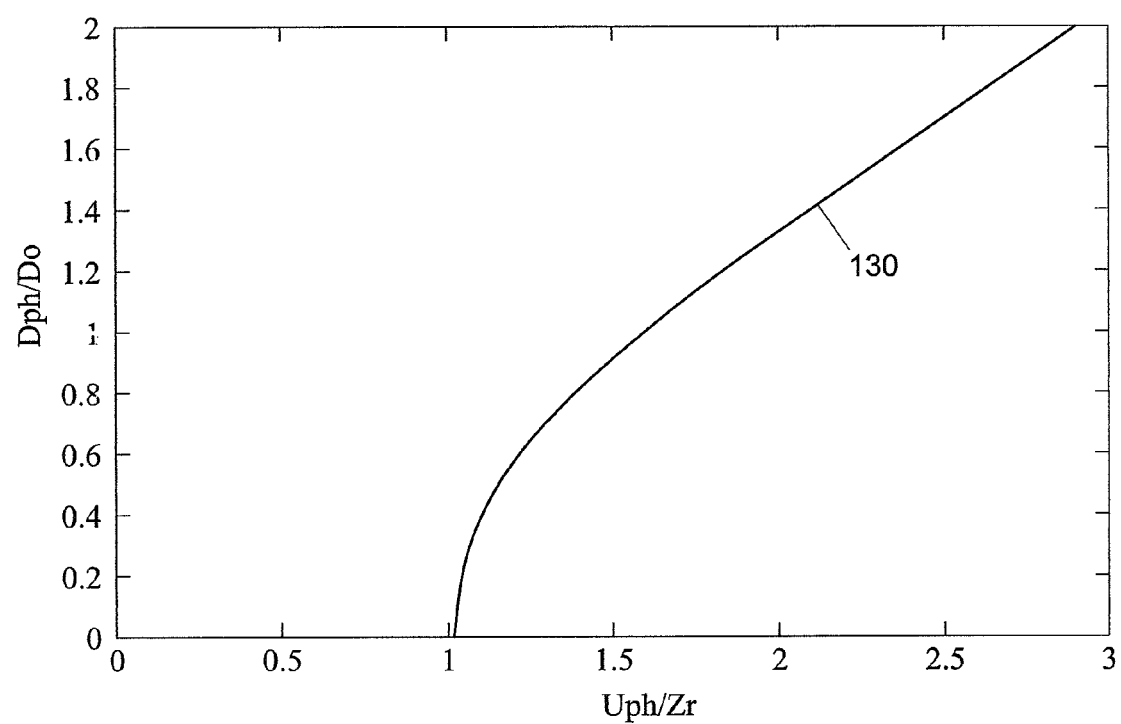
FIG. 18 shows a graph representing polynomial of pinhole parameters for which the effects of tilt can be reduced.

FIG. 18 shows a graph 130, which represents this polynomial.

Around the combinations of pinhole parameters described by this expression the configuration inherent IDE is substantially suppressed.

Combination of the pinhole parameter optimization and use of the pupil monitor in a differential confocal sensor results in a synergetic effect so that the obtained reduction of the inclination dependent error larger than the sum of reductions provided by each of these methods.

The invention claimed is:

1. An optical sensor for measuring a distance to an object surface, the optical sensor comprising:
    an illumination system including a radiation source for supplying a measuring beam;
    a focusing unit for focusing the measuring beam to a spot on the object surface;
    a detection system comprising:
        a radiation-sensitive detector for converting measuring beam radiation reflected from the object surface into an electrical signal representing a measured distance, and
        a signal processing circuit for processing the electrical signal; and a pupil-sensing system configured to determine tilt of the object surface from a pupil radiation distribution and comprising:
            a beam splitter, arranged between the focusing unit and the radiation-sensitive detector, for splitting a reflected measuring beam into a pupil-sensor beam and a distance measuring beam, and
            a position-sensitive detector, arranged in a path of the pupil-sensor beam such that the pupil-sensor beam incident on the position-sensitive detector is a collimated beam and the position-sensitive detector converts the pupil-radiation-distribution into pupil-sensor electrical signals that represent tilt of the object surface, the pupil-sensor electrical signals being suited for comparing with values of a look-up table obtained from calibration and finally for coupling to the signal processing circuit to correct the measured distance for tilt of the object surface area being measured.

2. The optical sensor as claimed in claim 1, wherein the position-sensitive detector is effectively arranged in a pupil of the focusing unit.

3. The optical sensor as claimed in claim 1, wherein the beam splitter is arranged at a position where the reflected measuring beam is a collimated beam.

4. The optical sensor as claimed in claim 1, further comprising:
    an actuator for moving the focusing unit along an axis of the focusing unit; and
    an optical axial position measuring system for measuring an axial position of the focusing unit.

5. The optical sensor as claimed in claim 4, wherein the optical axial position-measuring system is an interferometer.

6. The optical sensor as claimed in claim 5, wherein the interferometer is a double-pass interferometer.

7. The optical sensor as claimed in claim 6, having a beam splitter directing the distance measuring beam towards the object surface and directing the reflected measuring beam towards the radiation-sensitive detector, wherein the beam splitter is arranged in a path of an interferometer beam and constitutes a central beam splitter cube of the interferometer, which central beam splitter cube, in combination with at least two additional reflecting elements at different sides of the central beam splitter cube, guides the interferometer beam to and from a mirror on the focusing unit.

8. The optical sensor as claimed in claim 7, wherein a first one of the at least two additional reflecting elements is a truncated retro reflector prism having two opposite flat areas for passing the distance measuring beam and a second one of the at least two additional reflecting elements is one of the set consisting of: a plane mirror and a retro reflector prism.

9. The optical sensor as claimed in claim 1, wherein the detection system comprises:
    a further beam splitter for splitting the distance measuring beam into a first sub-beam and a second sub-beam;
    a first pinhole diaphragm and a first radiation-sensitive detector successively arranged in the first sub-beam; and
    a second pinhole diaphragm and a second radiation-sensitive detector successively arranged in the second sub-beam,
    whereby the optical distances between the further beam splitter and the first pinhole and the second pinhole, respectively are different.

10. The optical sensor as claimed in claim 9, wherein the positions and the opening diameters of the pinholes satisfies the following condition:

$$u_{ph\_dl} = 1.0196 + 0.0336 D_{ph\_dl} + 0.2832 D_{ph\_dl}^2 + 0.5876 D_{ph\_dl}^3 - 0.4033 D_{ph\_dl}^4 + 0.0763 D_{ph\_dl}^5$$

within the range: $D_{ph\_dl} = 0-2$ and $u_{ph\_dl} = 0-3$ wherein:

$$D_{ph\_dl} = D_{ph}/D_0$$

$$U_{ph\_dl} = u_{ph}/z_r$$

and $D_{ph}$ is pinhole diameter, $D_0$ is beam waist diameter of the measuring beam, $u_{ph}$ is distance between the pupil and best focus and $z_r$ is radial offset, due to tilt of the object surface, of the measuring beam at the location of the pupil.

11. The optical sensor as claimed in claim 2, wherein the beam splitter is arranged at a position where the reflected measuring beam is a collimated beam.

12. An optical sensor for measuring the distance to an object surface, the optical sensor comprising:
    an illumination system including a radiation source for supplying a measuring beam;
    a focusing unit including:
    an objective for focusing the measuring beam to a spot on the object surface, and a mirror;
    a detection system comprising a radiation-sensitive detector for converting measuring beam radiation reflected from the object surface into an electrical signal representing an actually measured distance;
    a beam splitting unit for directing the measuring beam towards the object surface and for directing a reflected measuring beam towards the radiation-sensitive detector;

an actuator for moving the focusing unit along an axis of the focusing unit;
an interferometer system configured to measure an axial position of the focusing unit, said beam splitting unit being arranged in a path of an interferometer beam of the interferometer system to form a central beam splitter cube of the interferometer system; and
at least two additional reflecting elements at different sides of the central beam splitter cube, which in combination with the central beam splitter cube, guide the interferometer beam to and from the mirror of the focusing unit.

13. The optical sensor as claimed in claim 12, wherein the interferometer system is a double-pass interferometer system.

14. The optical sensor as claimed in claim 12, wherein a first one of the at least two additional reflecting elements is a truncated retro reflector prism having two opposite flat areas for passing the distance measuring beam and a second one of the at least two additional reflecting elements is one of the set consisting of: a plane mirror and a retro reflector prism.

15. The optical sensor as claimed in claim 14, further comprising:
a first quarter wave plate located between the central beam splitter cube and the mirror on the focusing unit, and
a second quarter wave plate located between the central beam splitter cube and the first or second one of the at least two additional reflecting elements.

16. The optical sensor as claimed in claim 15, wherein the assembly of the central beam splitter cube, the first and second quarter wave plate and the first and second one of the at least two additional reflecting elements is configured so that a first total pathlength of the interferometer beam through the assembly and a second total pathlength of an interferometer reference beam of the interferometer through the assembly are equal to each other.

17. The optical sensor as claimed in claim 15, wherein the central beam splitter cube, the first and second quarter wave plate and the first and second one of the at least two additional reflecting elements are rigidly connected to each other to form the splitting unit.

18. The optical sensor as claimed in claim 12, wherein the detection system further comprises:
a further beam splitter for splitting the distance measuring beam into a first sub-beam and a second sub-beam,
a first pinhole diaphragm and a first radiation-sensitive detector successively arranged in the first sub-beam; and
a second pinhole diaphragm and a second radiation-sensitive detector successively arranged in the second sub-beam,
whereby the optical distances between the further beam splitter and the first pinhole and the second pinhole, respectively are different.

19. An optical sensor for measuring the distance to an object surface, which sensor comprising:
an illumination system including a radiation source for supplying a measuring beam;
a focusing unit for focusing the measuring beam to a spot on the object surface; and
a detection system comprising;
a radiation-sensitive detector for converting measuring beam radiation reflected from the object surface into an electrical signal representing a measured distance, and
a signal processing circuit for processing the electrical signal and a pupil-sensing system configured to determine tilt of the object surface from the pupil radiation distribution and comprising:
a beam splitter, arranged between the focusing unit and the radiation sensitive detector, for splitting a reflected measuring beam into a pupil-sensor beam and a distance measuring beam, and
a position-sensitive detector, arranged in the path of the pupil-sensor beam, for converting a radiation distribution of the pupil-sensor beam that is indicative of radiation distribution in a pupil of the focusing unit into pupil-sensor electrical signals that represent tilt of the object surface, the pupil-sensor electrical signals being suited for comparing with values of a look-up table obtained from calibration and finally for coupling to the signal processing circuit to correct the measured distance for tilt of the object surface area being measured.

20. An optical sensor for measuring a distance to an object surface, the optical sensor comprising:
an illumination system including a radiation source for supplying a measuring beam;
a focusing unit for focusing the measuring beam to a spot on the object surface;
a detection system comprising:
a radiation-sensitive detector for converting measuring beam radiation reflected from the object surface into an electrical signal representing a measured distance, and
a signal processing circuit for processing the electrical signal and a pupil-sensing system configured to determine tilt of the object surface from a pupil radiation distribution and comprising:
a beam splitter, arranged between the focusing unit and the radiation-sensitive detector, for splitting a reflected measuring beam into a pupil-sensor beam and a distance measuring beam,
an imaging lens system located in a path of the distance measuring beam between the beam splitter and the radiation-sensitive detector, and
a position-sensitive detector, arranged in the path of the pupil-sensor beam for converting the pupil radiation distribution of the pupil-sensor beam into pupil-sensor electrical signals that represent tilt of the object surface, wherein no lens affects the pupil-sensor beam in a path of the pupil-sensor beam between the beam splitter and the position-sensitive detector, the pupil-sensor electrical signals being suited for comparing with values of a look-up table obtained from calibration and finally for coupling to the signal processing circuit to correct the measured distance for tilt of the object surface area being measured.

21. The optical sensor as claimed in claim 20, wherein the beam splitter is arranged at a position where the reflected measuring beam is a collimated beam.

* * * * *